(12) United States Patent
Ragner

(10) Patent No.: US 10,359,131 B2
(45) Date of Patent: Jul. 23, 2019

(54) COLLAPSIBLE HOSES AND PRESSURE SYSTEMS

(71) Applicant: Ragner Technology Corporation, Gainesville, FL (US)

(72) Inventor: Gary Dean Ragner, Gainesville, FL (US)

(73) Assignee: Ragner Technology Corporation, Newberry, FL (US)

( * ) Notice: Subject to any disclaimer, the term of this patent is extended or adjusted under 35 U.S.C. 154(b) by 110 days.

(21) Appl. No.: 14/093,985

(22) Filed: Dec. 2, 2013

(65) Prior Publication Data

US 2014/0150889 A1 Jun. 5, 2014

Related U.S. Application Data

(60) Provisional application No. 61/732,291, filed on Dec. 1, 2012.

(51) Int. Cl.
*F16K 11/02* (2006.01)
*F16L 11/11* (2006.01)
(Continued)

(52) U.S. Cl.
CPC ............... *F16L 11/11* (2013.01); *F16L 11/10* (2013.01); *F16L 11/12* (2013.01); *Y10T 137/0396* (2015.04)

(58) Field of Classification Search
CPC . F16L 11/11; F16L 11/12; F16L 35/00; A62C 31/02; A62C 33/00
(Continued)

(56) References Cited

U.S. PATENT DOCUMENTS

| 2,396,059 A | 3/1946 | Leo et al. |
| 2,867,833 A | 1/1959 | Duff |

(Continued)

FOREIGN PATENT DOCUMENTS

| DE | 26 02 502 A | 7/1976 |
| DE | 197 38 329 A | 3/1999 |

(Continued)

OTHER PUBLICATIONS

International Search Report and Written Opinion dated Feb. 13, 2014 for Application No. PCT/US2013/069301.

(Continued)

*Primary Examiner* — Reinaldo Sanchez-Medina
(74) *Attorney, Agent, or Firm* — Vorys, Sater, Seymour and Pease LLP

(57) ABSTRACT

An extendible and collapsible pressure hose system can be created which comprises a collapsible pressure hose with a hose output connector mounted on one end and a fluid control system mounted on the other. In such a system, the collapsible pressure hose can, but need not comprise a coiled support wire, a convoluted hose body and/or an outer reinforcement cover. A fluid control system can comprise an input connector attached to hose, input connector housing, a main valve, and a pump. In such a fluid control system, the main valve can direct fluid within hose in three modes: 1) an open mode, where fluid pressure extends hose for use, 2) a retract mode, where the pump is used to pump fluid out of the hose, and 3) a closed mode, where no fluid can flow and in which the hose can be stowed.

19 Claims, 7 Drawing Sheets

(51) Int. Cl.
*F16L 11/12* (2006.01)
*F16L 11/10* (2006.01)

(58) Field of Classification Search
USPC ............ 137/115.04, 115.05, 115.11, 355.16,
137/355.18, 565.23, 596, 605; 138/46,
138/118, 119, 121; 239/195; 92/90;
91/443
See application file for complete search history.

(56) References Cited

U.S. PATENT DOCUMENTS

| | | | |
|---|---|---|---|
| 2,927,625 A | 3/1960 | Rothermel et al. | |
| 2,954,802 A | 10/1960 | Duff | |
| 3,028,290 A | 4/1962 | Roberts et al. | |
| 3,050,087 A | 8/1962 | Caplan | |
| 3,288,169 A | 11/1966 | Moss | |
| 3,353,996 A | 11/1967 | Hamrick | |
| 3,486,532 A | 12/1969 | Sawada | |
| 3,520,725 A | 7/1970 | Hamrick | |
| 3,623,500 A | 11/1971 | Hoy | |
| 3,845,779 A * | 11/1974 | Greene, Jr. ............ | A62C 33/00 137/209 |
| 3,861,424 A | 1/1975 | Mizutani et al. | |
| 3,966,121 A | 6/1976 | Littman | |
| 4,009,734 A | 3/1977 | Sullivan | |
| 4,050,113 A | 9/1977 | Wright et al. | |
| 4,096,888 A | 6/1978 | Stefano et al. | |
| 4,136,149 A | 1/1979 | Payne | |
| 4,704,765 A | 11/1987 | Ataka | |
| 4,955,106 A | 9/1990 | Stein et al. | |
| 5,023,959 A | 6/1991 | Mercer | |
| 5,036,890 A | 8/1991 | Whaley | |
| 5,156,349 A | 10/1992 | Wilson et al. | |
| 5,485,870 A | 1/1996 | Kraik | |
| 5,526,842 A | 6/1996 | Christensen | |
| 5,555,915 A | 9/1996 | Kanao | |
| 5,607,107 A | 3/1997 | Grieve et al. | |
| 5,740,851 A | 4/1998 | Haynes | |
| 5,778,941 A | 7/1998 | Inada | |
| 5,780,581 A | 7/1998 | Hermansen et al. | |
| 6,024,132 A | 2/2000 | Fujimoto | |
| 6,024,134 A | 2/2000 | Akedo et al. | |
| 6,098,666 A | 8/2000 | Wells et al. | |
| 6,182,327 B1 | 2/2001 | Gosselin | |
| 6,186,181 B1 | 2/2001 | Schippl | |
| 6,223,777 B1 | 5/2001 | Smith et al. | |
| 6,382,241 B1 * | 5/2002 | Setrum ................... | A47L 5/38 137/355.22 |
| 6,523,539 B2 | 2/2003 | McDonald et al. | |
| 6,607,010 B1 | 8/2003 | Kashy | |
| 6,948,527 B2 | 9/2005 | Ragner et al. | |
| 6,983,757 B1 | 1/2006 | Becker et al. | |
| 7,156,127 B2 | 1/2007 | Moulton et al. | |
| 7,398,798 B2 | 7/2008 | Ostan et al. | |
| 7,431,051 B2 * | 10/2008 | Schoellhorn ............ | B60R 15/00 137/355.12 |
| 7,520,302 B2 | 4/2009 | Smith | |
| 7,549,448 B2 | 6/2009 | Ragner | |
| 8,291,941 B1 | 10/2012 | Berardi | |
| 8,291,942 B2 | 10/2012 | Berardi | |
| 8,479,776 B2 | 7/2013 | Berardi | |
| 2002/0013974 A1 | 2/2002 | Gibson et al. | |
| 2003/0098084 A1 * | 5/2003 | Ragner ..................... | A47L 9/24 138/129 |
| 2004/0231096 A1 | 11/2004 | Battle et al. | |
| 2006/0005880 A1 * | 1/2006 | Baker .................... | A62C 33/00 137/355.16 |
| 2010/0108170 A1 | 5/2010 | Chudkosky et al. | |
| 2013/0180615 A1 | 7/2013 | Ragner et al. | |

FOREIGN PATENT DOCUMENTS

| | | |
|---|---|---|
| EP | 0 965 689 A | 12/1999 |
| FR | 2 336 624 A | 7/1977 |
| GB | 982 951 | 2/1965 |
| GB | 1 551 429 | 8/1979 |
| GB | 2 310 369 A | 8/1997 |
| JP | 2002-206670 | 7/2002 |
| WO | WO 1985/000277 | 1/1985 |
| WO | WO 1999/035954 | 7/1999 |
| WO | WO 2003/024294 | 3/2003 |
| WO | WO 2012/122601 | 9/2012 |

OTHER PUBLICATIONS

U.S. Office Action dated Feb. 26, 2007 for U.S. Appl. No. 11/343,602.
U.S. Office Action dated Apr. 30, 2008 for U.S. Appl. No. 11/343,602.
U.S. Office Action dated Mar. 16, 2012 for U.S. Appl. No. 11/343,602.
U.S. Office Action dated Jun. 13, 2013 for U.S. Appl. No. 11/343,602.
Notice of Allowability dated Feb. 25, 2009 for U.S. Appl. No. 11/234,944.
English language equivalent of German Patent DE 26 02 502.
Abstract and English Machine Translation of German Patent DE 197 38 329.
English language equivalent of French Patent FR 2 336 624.
Abstract and English Machine Translation of Japanese Patent JP 2002-206670.
U.S. Appl. No. 60/335,497, filed Nov. 24, 2001.
U.S. Appl. No. 60/648,638, filed Jan. 29, 2005.
U.S. Appl. No. 60/739,323, filed Nov. 23, 2005.

* cited by examiner

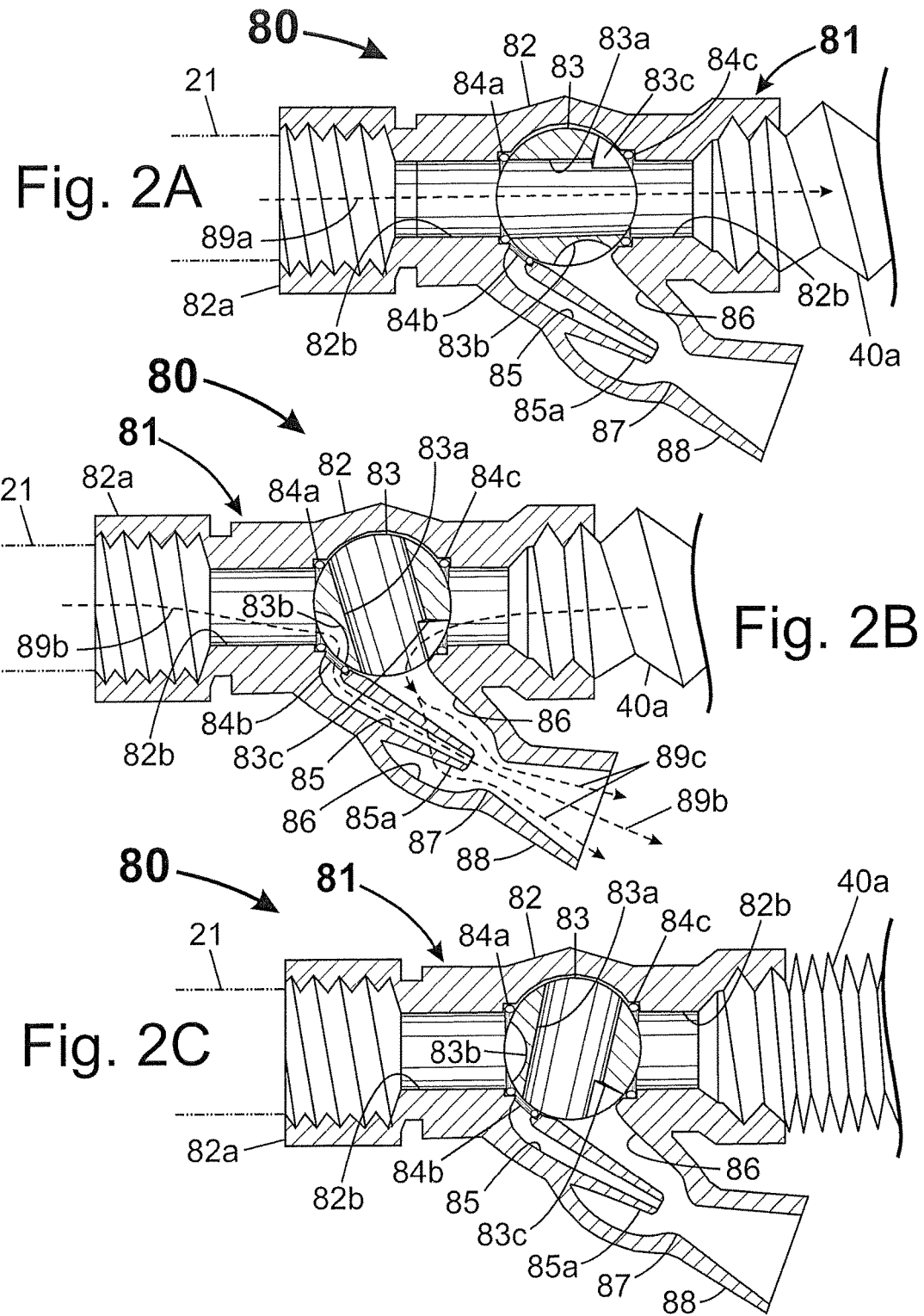

COLLAPSIBLE HOSES AND PRESSURE SYSTEMS

CROSS REFERENCE TO RELATED APPLICATIONS

This is a non-provisional of, and claims the benefit of, U.S. provisional patent application 61/732,291, titled "COLLAPSIBLE HOSES AND PRESSURE SYSTEMS" filed on Dec. 1, 2012 by the same inventor, the disclosure of which is hereby incorporated by reference in its entirety.

FIELD

The field of this invention relates to hoses for transporting pressurized fluids (liquids, gases, liquid/gas mixtures, solid particulate/gas mixtures), and more specifically to hoses that extend longitudinally when pressurized, and retract longitudinally when internal pressure is reduced below ambient pressure.

BACKGROUND

The present state of the art linearly extendable and retractable hoses includes both spring biased and elastic biased extendable and retractable hoses. While these hoses can be advantageous relative to hoses which are not extendable and retractable, there are several problems with existing extendable and retractable hoses. For example, for elastic biased hoses, there are problems of durability, temperature sensitivity, and excessive biasing force (elastic retracting force). For wire biased hoses, there are problems of difficulty in manufacturing, and too little biasing force. Accordingly, there is a need in the art for new technology which can address one or more problems associated with prior art extendable and retractable hoses.

SUMMARY

The technology disclosed herein can be used for purposes such as implementing an extendable and retractable hose which requires neither elastic nor wire biasing to cause the hose to collapse to its retracted length. For example, the disclosed technology could be used to implement a hose which would collapse longitudinally (i.e., lengthwise) when negative (i.e., below ambient) pressure is applied to hose's interior. Such a hose may be constructed to comprise a radial support structure adapted to resist radial collapse when fluid in the interior channel of the body of the hose is under pressure substantially below ambient. Examples presented of hoses with such radial support structures illustrate radial support being provided by polymer material, metal wire, and elastomer materials. It is also possible that a hose implemented using the disclosed technology could comprise elastic or wire biasing structures. However, because the disclosed technology can be used to implement extendable and retractable hoses which do not require strong elastic or wire biasing structures, hoses implemented based on this disclosure could potentially have less complex designs and shorter retraction times relative to existing extendable and retractable hoses.

Other advantages and objectives which can be achieved using the disclosed technology include:
a) To provide a collapsible hose control system that can alternately supply a pressurized fluid (liquid and/or gas) to extend a collapsible hose for use, or supply a vacuum pressure (pressure below ambient pressure) to retract or collapse the collapsible hose longitudinally for stowage.
b) To provide a collapsible hose control system that can alternately supply a pressurized fluid (liquid and/or gas) to extend a collapsible hose for use, or supply a vacuum pressure (pressure below ambient pressure) to retract or collapse the collapsible hose longitudinally for stowage. The control system further comprises a closed position maintaining the collapsible hose in its stowed position.
c) To provide a collapsible hose control system comprising a first valve for controlling introduction of a pressurized fluid (liquid and/or gas) into a collapsible hose for longitudinally extending the hose, and a second valve for supplying a vacuum pressure (pressure below ambient pressure) to create a retracting force to collapse the collapsible hose longitudinally for stowage.
d) To provide a collapsible hose control system for controlling introduction of a pressurized fluid (liquid and/or gas) into a collapsible hose comprising a main valve, a drive valve, and a fluid pump (liquid and/or gas). Where the main valve controls the introduction of the pressurized fluid into the collapsible hose, the drive valve controls introduction of pressurized fluid to drive the fluid pump to provide vacuum pressure (pressure below ambient pressure) to create a retracting force to collapse the collapsible hose longitudinally for stowage.
e) To provide a collapsible hose control system for controlling introduction of a pressurized fluid (liquid and/or gas) into a collapsible hose comprising a venturi pump which uses the pressurized fluid to suction the pressurized fluid out of the collapsible hose for stowage.
f) To provide a collapsible hose control system comprising three states of operation: 1) an open state for allowing a pressurized fluid to flow through a collapsible hose for use, 2) a drain state where fluid within the collapsible hose can escape to a suction supply, 3) a closed state where the volume of the collapsible hose is closed off from the ambient environment to hold the collapsible hose in its fully retracted and stowed state.
g) To provide a collapsible hose control system comprising three states of operation: 1) an open state for allowing a pressurized fluid to flow through a collapsible hose for use, 2) a drain state where fluid within the collapsible hose can escape to a suction supply and at the same time the pressurized fluid is opened to drive a pump to supply the suction supply, 3) a closed state where both the volume of the collapsible hose is closed off from the ambient environment to hold the collapsible hose in its fully retracted and stowed state, and the pressurized fluid is closed off from the ambient environment.
h) To provide a collapsible hose control system designed for controlling introduction of a pressurized gas (e.g. compressed air), a pressurized liquid (e.g. pressurized water), and a suction pressure (pressures lower than ambient pressure) as needed into a collapsible hose.
i) To provide a collapsible hose control system for controlling introduction of a pressurized gas (e.g. compressed air), a pressurized liquid (e.g. pressurized water), and a suction pressure (pressures lower than ambient pressure) as needed into a collapsible hose to provide various process for extension and retraction of the collapsible hose.
j) To provide a process for extending a large diameter longitudinally collapsible hose (e.g. collapsible fire hose) with a hose control system by controlling the introduction of a pressurized gas (e.g. compressed air), a pressurized liquid (e.g. pressurized water), and a suction pressure (pressures lower than ambient pressure) into the collapsible hose, comprising the steps of: 1) introducing the pressurized gas into the longitudinally collapsible hose to extend the hose with the light weight gas, and 2) introducing pressurized liquid into the collapsible hose during extension and/or after fully extended.

k) To provide a process for extending a large diameter longitudinally collapsible hose (e.g. collapsible fire hose) with a hose control system for controlling the introduction of a pressurized gas (e.g. compressed air), a pressurized liquid (e.g. pressurized water), and a suction pressure (pressures lower than ambient pressure) into the collapsible hose, comprising the steps of: 1) introducing the pressurized gas into the longitudinally collapsible hose to extend the hose with light weight gas, 2) introducing pressurized fluid into the collapsible hose after the collapsible hose has extended to the desired length, 3) using the collapsible hose with the pressurized fluid, and 4) introducing the suction pressure into the collapsible hose to collapse the hose longitudinally to its retracted and stowed length.

l) To provide a process for extending a large diameter longitudinally collapsible hose (e.g. collapsible fire hose) with a hose control system for controlling the introduction of a pressurized gas (e.g. compressed air), a pressurized liquid (e.g. pressurized water), and a suction pressure (pressures lower than ambient pressure) into the collapsible hose, comprising the steps of: 1) introducing the pressurized gas into the longitudinally collapsible hose to extend the hose with light weight gas, 2) introducing pressurized fluid into the collapsible hose after the collapsible hose has extended to the desired length, 3) using the collapsible hose with the pressurized fluid, 4) introducing the suction pressure into the collapsible hose to collapse the hose longitudinally to its retracted and stowed length, 5) locking the collapsible hose in its stowed length, 6) opening the end of the collapsible hose and introducing the pressurized gas to expel the remaining pressurized liquid, and 7) closing the end of the collapsible hose and applying suction pressure to dry the inside of the collapsible hose.

m) To provide a process for extending a large diameter longitudinally collapsible hose (e.g. collapsible fire hose) with a hose control system for controlling the introduction of a pressurized gas (e.g. compressed air), a pressurized liquid (e.g. pressurized water), and a suction pressure (pressures lower than ambient pressure) into the collapsible hose, comprising the steps of: 1) introducing the pressurized gas into the longitudinally collapsible hose to extend the hose with light weight gas, 2) introducing pressurized fluid into the collapsible hose after the collapsible hose has extended to the desired length, 3) using the collapsible hose with the pressurized fluid, 4) introducing compressed air into the collapsed hose to force most of the remaining fluid out of the hose, 5) introducing the suction pressure into the collapsible hose to collapse the hose longitudinally to its retracted and stowed length, 6) locking the collapsible hose in its stowed length.

n) To provide a process for extending a large diameter longitudinally collapsible hose (e.g. collapsible fire hose) with a hose control system for controlling the introduction of a pressurized gas (e.g. compressed air), a pressurized liquid (e.g. pressurized water), and a suction pressure (pressures lower than ambient pressure) into the collapsible hose, comprising the steps of: 1) closing the end of the collapsible hose and 2) applying suction pressure to the inside of the collapsible hose to vacuum dry the inside of the collapsible hose.

o) To provide a process for extending a large diameter longitudinally collapsible hose (e.g. collapsible fire hose) with a hose control system for controlling the introduction of a pressurized gas (e.g. compressed air), a pressurized liquid (e.g. pressurized water), and a suction pressure (pressures lower than ambient pressure) into the collapsible hose, comprising the steps of: 1) introducing pressurized fluid into the collapsible hose to extended the hose to the desired length, 2) using the collapsible hose with the pressurized fluid, 3) introducing the suction pressure into the collapsible hose to collapse the hose longitudinally to its retracted and stowed length.

p) To provide a process for extending a large diameter longitudinally collapsible hose (e.g. collapsible fire hose) with a hose control system for controlling the introduction of a pressurized gas (e.g. compressed air), a pressurized liquid (e.g. pressurized water), and a suction pressure (pressures lower than ambient pressure) into the collapsible hose, comprising the steps of: 1) introducing pressurized liquid into the collapsible hose to extended the hose to the desired length, 2) using the collapsible hose with the pressurized liquid, 3) introducing compressed air into the collapsed hose to force most of the remaining liquid out of the hose, 4) introducing the suction pressure into the collapsible hose to collapse the hose longitudinally to its retracted and stowed length, 5) locking the collapsible hose in its stowed length, 6) filling the collapsed hose with pressurized liquid to remove most air from the system.

q) To provide a collapsible hose system comprising a tube-shaped storage container (storage tube) that a collapsible hose can retract into for stowage.

r) To provide a collapsible hose system comprising a tube shaped storage container that a collapsible hose can retract into for stowage, and a piston attached to the input end of the collapsible hose, whereby the piston can slide to the end of the tube shaped storage container under pressure to expose the full length of the collapsible hose.

s) To provide a collapsible hose control system comprising a first valve for controlling introduction of a pressurized fluid (liquid and/or gas) into a collapsible hose for use, and a second valve for supplying a vacuum pressure (pressure below ambient pressure) to create a retracting force to collapse the collapsible hose longitudinally to a collapsed length (retracted length) for stowage.

t) To provide a pressure hose with an interior channel for transporting a pressurized fluid (liquid and/or gas), wherein the pressure hose can longitudinally extend to an extended length when the pressurized fluid is communicated into the hose's interior channel, and can longitudinally retract to a collapsed length when a suction pressure (absolute pressure below ambient pressure) is communicated into the hose's interior channel.

u) To provide a pressure hose with an interior channel for transporting a pressurized fluid (liquid and/or gas) that is longitudinally responsive to internal pressure above and below the ambient pressure. Where pressurized fluid above ambient pressure tends to longitudinally extend the pressure hose and fluid pressures below ambient pressure tend to longitudinally retract the pressure hose.

v) To provide a pressure hose with an interior channel for transporting a pressurized fluid (liquid and/or gas) that is longitudinally responsive to internal pressure above and below the ambient pressure, and comprises radial support along the length of the pressure hose to prevent radial collapse of the pressure hose when internal pressures are applied that are below ambient pressure. Thereby allowing the pressure hose to retract longitudinally when sufficient vacuum pressure (pressure below ambient) is applied to the interior channel.

w) To provide a longitudinally collapsible pressure hose with an interior channel for transporting a pressurized fluid (liquid and/or gas) that is longitudinally responsive to internal pressure above and below the ambient pressure, and comprises a helical wear strip bonded to the exterior of the pressure hose that provides both wear protection and radial support for the pressure hose.

x) To provide a longitudinally collapsible pressure hose that is longitudinally responsive to internal pressure, and comprises a coiled wire bonded to the exterior of the pressure hose to provide radial support during retracting of the hose when internal pressure is significantly below ambient pressure.

y) To provide a longitudinally collapsible pressure hose that is longitudinally responsive to both positive and negative relative internal pressure, and comprises a coiled stiffening structure bonded to the pressure hose along its length to provide radial support during retracting of the hose when internal pressure is significantly below ambient pressure.

z) To provide a longitudinally collapsible pressure hose that is longitudinally responsive to both positive and negative relative internal pressure, and comprises a coiled stiffening structure bonded to the pressure hose along its length to provide radial support during retracting of the hose when internal pressure is significantly below ambient pressure.

aa) To provide a longitudinally collapsible pressure hose that is longitudinally responsive to internal pressure, comprising a coiled stiffening structure mounted inside the pressure hose along its length to provide radial support during retracting of the hose when internal pressure is significantly below ambient pressure.

bb) To provide a longitudinally collapsible pressure hose that is longitudinally responsive to both positive and negative relative internal pressure, and comprises a coiled stiffening structure bonded to the pressure hose along its length to provide radial support during retracting of the hose when internal pressure is significantly below ambient pressure.

cc) To provide a longitudinally collapsible pressure hose that is longitudinally responsive to internal pressure, and has a convoluted or helical structure with a valley and a ridge and a radial support structure.

dd) To provide a longitudinally collapsible pressure hose that is longitudinally responsive to both positive and negative relative internal pressure, and has a corrugated or accordion like structure with multiple valleys, multiple ridges and a radial support structures along the pressure hose's length.

ee) To provide a longitudinally collapsible pressure hose that is longitudinally responsive to both positive and negative relative internal pressure, and comprises a corrugated elastic inner hose that provides radial support along the pressure hose's length.

ff) To provide a longitudinally collapsible pressure hose that is longitudinally responsive to both positive and negative relative internal pressure, and comprises a convoluted elastic inner hose that provides radial support along the pressure hose's length to allow the pressure hose to longitudinally retract (longitudinally collapse) when the hose's internal pressure is dropped below ambient pressure.

gg) To provide a longitudinally collapsible pressure hose that is longitudinally responsive to both positive and negative relative internal pressure, and comprises a corrugated elastic inner hose that defines a radial support along the inner hose's length to allow the pressure hose to longitudinally retract (longitudinally collapse) when the inner hose's internal pressure is dropped below ambient pressure.

hh) To provide a longitudinally collapsible pressure hose that is longitudinally responsive to both positive and negative relative internal pressure, and comprises a elastic inner hose that is provided with radial support along the pressure hose's length and provides partial retraction of the pressure hose due to the elastic nature of the elastic inner hose, and full retraction, or longitudinal collapse, of the pressure hose is provided when the inner hose's internal pressure is dropped sufficiently below ambient pressure.

ii) To provide a longitudinally collapsible pressure hose that is longitudinally responsive to both positive and negative relative internal pressure, and comprises a cylindrical hose body with radial support structure(s) in contact with the cylindrical hose body along its length. Where the cylindrical hose body can comprise an outer cover woven of high-strength yarn and an inner hose positioned within the outer cover to provide a sealed conduit for pressurized fluid to flow through.

jj) To provide a longitudinally collapsible pressure hose that is longitudinally responsive to both positive and negative relative internal pressure, and comprises a corrugated hose body with radial support structure(s) bonded to the cylindrical hose body periodically along its length. Where the cylindrical hose body can comprise an outer cover woven of high-strength yarn and an inner hose positioned within the outer cover to provide a sealed conduit for pressurized fluid to flow through.

kk) To provide a longitudinally collapsible pressure hose (linearly collapsible hose) that is designed for attachment to both a pressurized fluid source and a lower than ambient pressure (suction pressure) source. Wherein the pressurized fluid can be provided for extend the hose and the suction pressure source can be applied for retract the hose.

ll) To provide a longitudinally collapsible pressure hose that is designed for attachment to a pressurized fluid source, a compressed gas source, and a lower than ambient pressure suction source, wherein the compressed gas source is used to extend the hose before introducing a much heavier pressurized fluid from a pressurized fluid source (e.g. a water pump). After the hose is partially or fully extended, the pressurized fluid source can provide a pressurized liquid to the hose for use, wherein after use, the suction pressure source can be applied to retract the hose.

mm) To provide a longitudinally collapsible pressure hose (linearly collapsible hose) attached a pump for creating a suction pressure within the hose's interior (an absolute pressure significantly below the ambient pressure outside the hose) to retract and longitudinally collapsible pressure hose.

nn) To provide a water driven pump for use with a longitudinally collapsible pressure hose, wherein the water driven pump can suction the water out of the collapsible pressure hose and thereby cause the collapsible hose to longitudinally retract.

oo) To provide a water driven pump for use with a longitudinally collapsible pressure hose, wherein the water driven pump can suction the water out of the collapsible pressure hose and thereby cause the collapsible hose to longitudinally retract. Wherein the water driven pump comprises a water turbine attached to a water pump.

pp) To provide a water driven pump for use with a longitudinally collapsible pressure hose, wherein the water driven pump can suction the water out of the collapsible pressure hose and thereby cause the collapsible hose to longitudinally retract, wherein the water driven pump comprises a reverse venturi and throat suction pump.

BRIEF DESCRIPTION OF THE DRAWINGS

FIGS. 2A-C Section view of a collapsible pressure hose control system, wherein the control system comprises a reverse venturi water driven pump that uses a single control valve to extend (FIG. 2A), retract (FIG. 2B), and store (FIG. 2C) the collapsible hose.

DETAILED DESCRIPTION

In FIGS. 1A through 2C, we see longitudinally collapsible hose systems 50, 60, 70 and 80 comprising a collapsible hose 40*a* combined with a fluid control system 51, 61, 71, and 81, respectively. In those figures, fluid control systems 51, 61, 71, and 81 comprise pressurized fluid supply connectors 52*a* and/or 82*a* for connecting to a pressurized fluid supply source 21, and various pumping systems to produce the vacuum pressure (suction pressure) for retracting the collapsible hose 40*a*. The reader should understand that many styles and types of supply connectors are presently used in hydraulic and pneumatic hose systems, and these styles and types of connectors can replace the screw-on style connectors 52*a*, 82*a* and 152*a* shown as examples in the figures. Pressurized fluid supply source 21 can comprise nearly any pressurized fluid source (e.g., pressurized liquid, gas, liquid/gas mixture, liquid/solid mixture, and solid/gas mixture). Collapsible hose 40*a* is used here as an example, but any of the longitudinally collapsible hoses disclosed herein can be used.

Figure 1A:
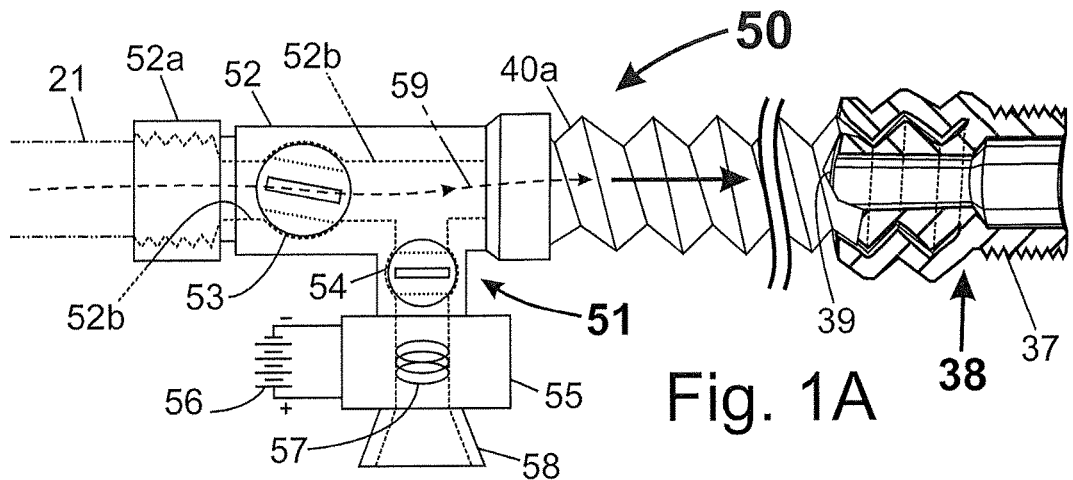
FIG. 1A A collapsible pressure hose with an electrically driven pump for retracting the hose.

In FIG. 1A, we see extendible and collapsible hose system 50 comprising a collapsible hose 40*a* connected to suction supplying fluid control system 51 at one end and an output connector 38 at the other end. Each of the collapsible hose systems disclosed here can have an output connector similar to connectors 38, or other end connector designs. Similarly, a nozzle and other flow restricting tools can be permanently bonded to the output end of hose 40*a* if desired. Fluid control system 51 can comprise a pressurized supply connector 52*a*, an input connector housing 52, a supply valve 53, a drain valve 54, a pump housing 55, an electrical power supply 56, a suction pump 57, and a discharge port 58. Housing 52 defines an interior channel 52*b* that fluidly connects supply connector 52*a*, hose 40*a*, and drain valve 54 when supply valve 53 is open. Inner channel 52*b* connects to hose 40*a* and suction pump 57 so that fluid can flow from hose 40*a* to pump 57 when drain valve 54 is open. Discharge port 58 is fluidly connected to pump 57 to direct pumped fluids out of housing 52 (out of channel 52*b* and collapsible hose 40*a*) and can comprise a short length of hose to discharge the fluid away from housing 52. Suction pump housing 55 supports suction pump 57, and can alternatively also comprise valve 54, power supply 56 and discharge port 58. By activating suction pump 57 with electrical power supply 56 when valve 53 is closed and valve 54 is open, suction pressure is created within channel 52*b* can be used to longitudinally collapse hose 40*a* to its retracted position (see fully retracted position of hose 40*a* in FIG. 2C). The reader should understand for this discussion supply valve 53 can be optional since most pressurized fluid sources will have their own supply valve. Thus, if the pressurized fluid supply 21 was a household water faucet, then that faucet's valve can replace valve 53 in this design. However, if the user wants to move hose 40*a* to another faucet, a valve such as valve 53 could be used to close off the inlet to hose 40*a* from the environment so the suction pressure generated by pump 57 is maintained within hose 40*a* while the hose system is being transported. In contrast, notice that fluid control systems 61 and 71, in FIGS. 1B and 1C, respectively, include a main valve 63 and 73 (or similar valves) to divert fluid pressure to motor 65*a* and reverse venturi nozzle 75 to provide power to suction pumps 67 and 77, respectively.

Output connector 38 is shown in FIG. 1A comprising a flow restriction 39 and a threaded connector end 37. Output connector 38 is designed to be attached to the output end of hose 40*a* and form a water-proof and/or air-tight seal with hose 40*a*, such that a fluid can flow from input connector 22 through collapsible hose system 50 and out threaded connector 37. Threaded connector end 37 can be designed to connect to a variety of nozzles and tools that can provide additional flow restriction (e.g. other hose connectors, valves, spray nozzles, sprinklers, soak hoses, compressed air connectors, compressed air nozzles, pneumatic tools, sand blast nozzles, etc.). Connector end 37 can be customized for the particular industry it will be used in. For example, for the fire fighting industry, connector end 37 can be designed to attach to standard fire fighting nozzles.

In FIG. 1A, supply valve 53 is shown open and supplying collapsible hose 40a with a fluid material (liquids and/or gases) flowing along fluid path 59. Valve 53 can be used to control the flow of fluid to hose 40a and to drain valve 54. Drain valve 54 is connected to channel 52b between hose 40a and suction pump 57 so that when this valve is opened, fluid within hose 40a can be sucked out by suction pump 57. Power supply 56 supplies electrical power to pump 57 for pumping fluid out of hose 40a through channel 52b and valve 54 when open (valve 54 shown closed in FIG. 1A). Fluid pumped out of hose 40a can exit through discharge port 58. Housing 52 can be made from a single injection molded or cast part, with connector 52a, hose 40a, and valves 53 and 54 attached later. Pressurized fluid supply connector 52a (supply connector), as well as many other supply connectors shown in this patent, can be threaded connectors or other style of connector (e.g. quick connect connectors, such as quick connectors 154 and 156 in FIG. 5B) depending on that particular need. In fact, the supply connectors 52a, 82a, and 152a can comprise nearly any of the prior art connector technologies, depending on what industry hose 40a is being used in (e.g. garden hose, compressed air hose, hydraulic hose, etc.). Pressurized fluid supply source 21 is drawn as a generic conduit in this patent, but represents any of the hundreds of types and styles of pressurized fluid sources that exist in many industries, including but not limited to, household water supplies, compressed air supplies, hydraulic fluid sources, pressurized liquids and/or gases, pressurized solid particle and liquid mixtures, etc.

Figure 1B:
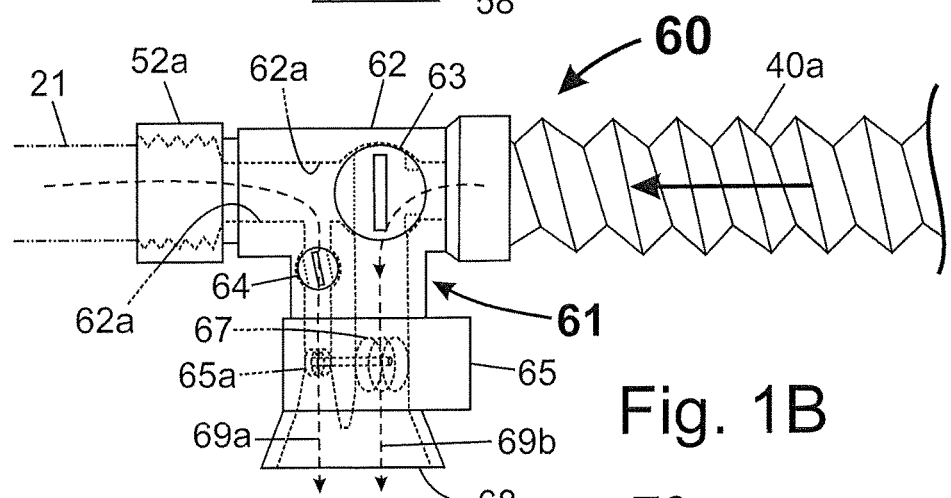
FIG. 1B A collapsible pressure hose with a water pressure driven pump for retracting the hose.

In FIG. 1B, we see retractable and collapsible hose system 60 comprising the previously discussed collapsible hose 40a connected to fluid control system 61 which is designed to generate suction pressure within hose 40a for retracting the hose. Fluid control system 61 comprises a pressurized supply connector 52a, a hydraulic and/or pneumatic motor 65a, an fluid control housing 62, a main valve 63, a motor valve 64, a pump housing 65, a suction pump 67, and an discharge port 68. Housing 62 defines an interior channel 62a fluidly connecting supply connector 52a, supply valve 63, hose 40a, motor valve 64, and suction pump 67. In FIG. 1B, valves 63 and 64 are positioned so that inner channel 62a connects hose 40a and suction pump 67, so that fluid can be pumped out of hose 40a by pump 67. Discharge port 68 can be fluidly connected to pump 67 to direct pumped fluids out of fluid control system 61 and can comprise a short length of hose to discharge the fluid away from fluid control system 61. Suction pump housing 65 supports fluid motor 65a and suction pump 67, and can alternatively also comprise valve 64, and/or discharge port 68. By activating suction pump 67, suction pressure within channel 62a can be used to longitudinally collapse hose 40a to its retracted position (see fully retracted position of hose 40a in FIG. 2C). Pressurized fluid flow 69a is used to power motor 65a, while fluid within hose 40a is pumped out by pump 67 along fluid flow path 69b.

In FIG. 1B, supply valve 63 is shown in its discharge position with supply connector 52a closed-off from hose 40a. In this position, valve 63 is open for fluid to flow from hose 40a to suction pump 67. In FIG. 2B, valve 64 is shown nearly completely open, in which configuration pressurized fluid from the left portion of inner channel 62a can flow through motor 65a to generate power to drive suction pump 67. Fluid supply connector 52a, can supply pressurized fluid to drive motor 65a even when fluid is closed-off from reaching hose 40a. The power for pump 67 comes from the fluid flowing through motor 65a (valve 64 shown open in FIG. 1B). Thus, the shown positions for valves 63 and 64 allow fluid to be pumped out of hose 40a through valve 63, through suction pump 67 and out discharge port 68. Housing 62 can be made from one or more injection molded or cast part, with connector 52a, hose 40a, pump housing 65, and valves 63 and 64 attached later. Valve 63 can have three functional position: 1) a discharge position as shown in FIG. 1B, 2) an operational position where valve 63 is rotated ninety degrees counter-clockwise so that fluid can flow from supply connector 52a to hose 40a, and 3) a stowed position where valve 63 can be rotated one-hundred eighty degrees the shown position to close-off hose 40a from the rest of fluid control system 61 for stowage.

Figure 1C:
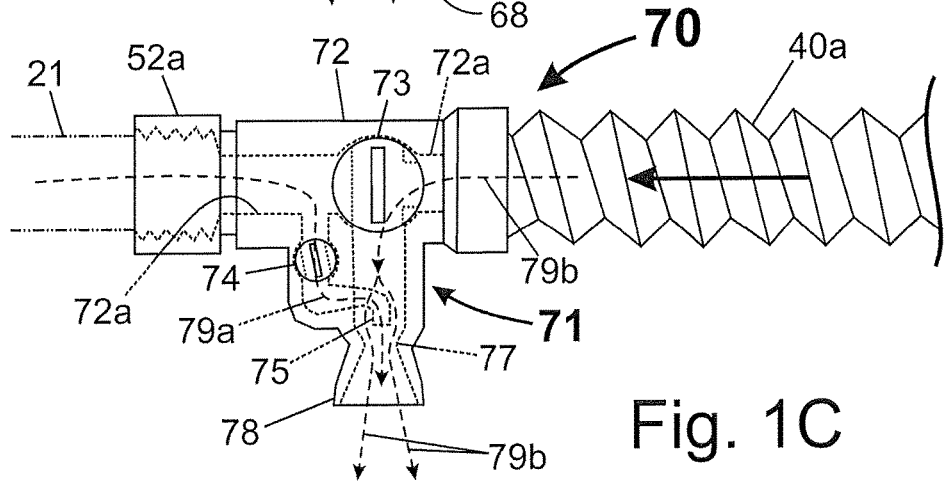
FIG. 1C A collapsible pressure hose with a reverse venturi water driven pump to retract the hose.

In FIG. 1C, we see extendible and collapsible hose system 70 comprising the previously discussed collapsible hose 40a connected to fluid control system 71. Fluid control system 71 is designed to supply its own suction pressure for retracting hose 40a. Fluid control system 71 comprises a pressurized fluid supply connector 52a, an input connector housing 72, a main valve 73, a venturi valve 74, a venturi nozzle 75, a venturi throat/pump 77, and an discharge port 78. Housing 72 defines an interior channel 72a fluidly connecting supply connector 52a, supply valve 73, hose 40a, venturi valve 74, and venturi throat/pump 77. Inner channel 72a connects supply connector 52a, hose 40a, and venturi throat/pump 77 so that fluid can flow to hose 40a from connector 52a and also be pumped out of hose 40a by venturi throat/pump 77. Discharge port 78 can be fluidly connected to venturi throat/pump 77 to direct pumped fluids out of fluid control system 71 and can comprise a short nozzle or piece of hose to discharge the fluid away from fluid control system 71. Housing 72 also supports a fluid motor comprised of venturi nozzle 75 and suction pump throat 77, and can alternatively also comprise valve 73, Valve 74, and/or discharge port 78. Using venture throat/pump 77, suction pressure within the right side of channel 72a can be used to longitudinally collapse hose 40a to its retracted position (see fully retracted position of hose 40a in FIG. 2C).

In FIG. 1C, main valve 73 is shown in its discharge position with supply connector 52a closed-off from hose 40a. In this position, valve 73 is open for fluid to flow from hose 40a to venturi throat/pump 77. With valve 74 nearly completely open, as shown, pressurized fluid from the left portion of inner channel 72a flows to venturi nozzle 75 and provides the power to drive venture throat/pump 77. Fluid supply connector 52a can supply pressurized fluid to venturi nozzle 75 even when fluid is closed-off from reaching hose 40a. The power for pumping fluid with venturi throat/pump 77 comes from the pressurized fluid flowing at high-speed out of nozzle 75. Thus, with valves 73 and 74 in the shown position, fluid can be pumped out of hose 40a through valve 73, and venturi throat/pump 77, and finally expelled through discharge port 78. Housing 72 can be made from one or more injection molded or cast parts, with connector 52a, hose 40a, venturi nozzle 75, venturi throat/pump 77 and valves 73 and 74 attached later. Valve 73 can have two functional positions: 1) a discharge position as shown in FIG. 1B, and 2) an operational position where valve 73 is rotated ninety degrees counter-clockwise so that fluid can flow from supply connector 52a to hose 40a through valve 73, and at the same time venture throat/pump 77 and discharge port 78 are closed off. Valve 73 can be the same as valve 63 and also have a third state where valve 73 can be rotated one-hundred eighty degrees to close-off hose 40a from the rest of fluid control system 71 for stowage. This third closed state is optional and can be omitted, for example, if the pressurized fluid supply 21 has its own shutoff valve and/or the hose is not often removed for transport. For transport of collapsible hose system 70, valve 73 can be rotated one-hundred eighty degrees clockwise from its position shown to close-off hose 40b from the remainder of channel 72a so that hose 40a can remain in a retracted position even when disconnected from fluid supply 21.

In FIGS. 2A-C, we see a collapsible hose system 80 comprising a collapsible hose 40a connected to suction producing fluid control system 81. A fluid control system 81 comprises a housing 82, fluid supply connector 82a, an interior channel 82b, a venturi nozzle channel 85, a venturi suction pump chamber 86, a main valve 83, and a venturi pump. The main valve 83 can comprise a spherical housing with a main supply valve channel 83a, a venturi nozzle valve channel 83b, a suction valve channel 83c, and three gaskets 84a-c. The venturi pump comprises a venturi channel 85, a venturi nozzle 85a, a venturi pump throat 87, a suction chamber 86, and a discharge port 88. Main valve 83 has two main gaskets 84a and 84c, and one venturi gasket 84b to provide seals for directing fluid flow within housing 82 depending on the position of valve 83. Supply connector 82a is connected to a pressurized fluid source 21 and in fluid communication with inner channel 82b for supplying main valve 83 with pressurized fluid.

In FIGS. 2A-C, we see that main valve 83 has three valve channels 83a, 83b, and 83c for directing fluid flow in housing 82. With main valve 83 in the position shown in FIG. 2A, supply channel 83a can be used to direct pressurized fluid from connector 82a to hose 40a for use. Thus, a pressurized fluid source 21 (e.g. a water faucet, compressed air hose, etc.) when connected to connector 82a can supply a pressurized fluid to hose 40a through connector 82a and channels 82b and 83a with gaskets 84a and 84c providing a seal to substantially prevent pressurized fluid from escaping through channel 85 and chamber 86.

In FIG. 2B, with main valve 83 in the position shown, venturi valve channel 83b can supply pressurized fluid to venturi nozzle channel 85 with gasket 84b providing a seal. This provides pressurized fluid to venturi nozzle 85a for creating a reverse venturi effect in throat 87 and providing a suction pressure (below ambient pressure) within suction chamber 86. In this position, suction valve channel 83c along with main channel 83a are positioned to connect the interior of hose 40a with suction chamber 86 so that fluid within hose 40a can be pumped out of hose 40a by the suction pressure (vacuum pressure). In FIG. 2B, venturi nozzle 85a is positioned to spray pressurized fluid into venturi throat 87 at high-speed to entrain fluid within chamber 86 and pump fluid out of the hose through discharge port 88. The shape and positioning of nozzle 85a and venturi throat 87 can be optimized for maximum suction pressure, maximum fluid pumping rate, or a compromise between suction pressure and fluid pumping rate. In alternate designs, channel 83b can be reshaped so that it forms a short venturi nozzle by itself. This short venturi nozzle can be similar to the end portion of venturi nozzle 85a and provide a similar high-speed fluid flow directly into a venturi throat similar to throat 87 (e.g. valve 83 would spray fluid directly into a venturi throat near valve 83). In this way, this short venturi nozzle and throat 87 can still provide similar suction pressure for retracting hose 40a without the added structure of channel 85 and nozzle 85a. That is, construction of housing 82 can be simplified by replacing both venturi channel 85 and venturi nozzle 85a with this short venturi nozzle defined on valve 83.

In FIG. 2C, main valve 83 is positioned in a closed state, where all three channel 83a-c are positioned so that valve 83 can stop fluid from flowing in all channels and chambers (input connector 82a, venturi channel 85, suction chamber 86, and hose 40a are closed-off at the same time. Thus, this position can, in combination with closing off a suitable flow restrictor at the discharge end of the hose, provide a closed and stowed position where hose 40a can be fully retracted and the volume of space inside hose 40a is substantially closed-off from the ambient environment and held constant so that hose 40a can remain retracted during storage.

In FIGS. 2A-C, main valve 83 is shown in three functional positions: 1) open, 2) drain and 3) stowed positions, respectively. The open position (FIG. 2A) provides a clear path for a pressurized fluid to flow from input connector 82a to hose 40a for use. The drain position (FIG. 2B) provides a passage for pressurized fluid to feed venturi nozzle channel 85 and venturi nozzle 85a, and a passage for fluid within hose 40a to drain to suction pump chamber 86 for retracting hose 40a. The closed position (FIG. 2C), in combination with closing off a suitable flow restrictor at the discharge end of the hose, seals off pressurized fluid from connector 82a and also seals-off fluid from entering or leaving hose 40a. This substantially holds hose 40a at the length it was at before valve 83 was closed.

In FIG. 2C, we also see that valve 83 has a closed position, where fluid from both connector 82a and hose 40a are closed off from exiting through the venturi pump (i.e. channel 85 and chamber 86). This position can be used to stop the flow of fluid to hose 40a and also to secure hose 40a in its retracted or stowed position shown. Notice that, in the exemplary implementation of FIGS. 2A-C, the drain position shown in FIG. 2B is only a small angle of rotation away from the closed position seen in FIG. 2C. This can allow the user to suction the fluid out of hose 40a with valve 83 in the drain position (FIG. 2B) and to longitudinally retract the hose to its stowed position and then quickly turn valve 83 to its closed position seen in FIG. 2C to hold hose 40a in its stowed position for stowage, while at the same time closing off the pressurized fluid from connector 82a.

Turning now to FIGS. 3A through 5A, those figures depict several collapsible hoses 90a-c, 100, 100a, 110, and 120 comprising various hose structures and various radial supports along the length of the hoses. Each of these collapsible hose designs can in principle have a single wall construction (see FIG. 3B) comprising a reinforcement fabric tube infused and/or coated with a flexible polymer to form a water tight and/or air tight collapsible hose. Various laminate hoses can also be used with each layer having the properties needed to provide the desired elasticity, durability (e.g., resistance of the hose to deterioration of the material making up its internal structure), and wear resistance (e.g., resistance to frictional removal of exterior material in contact with the environment). As described in further detail in the specific discussion of FIGS. 3A through 5A, collapsible hoses created using the technology disclosed herein can be constructed in a manner which provides radial support to prevent such hoses from collapsing radially from vacuum pressure before they can collapse longitudinally. For collapsible hose 90a, radial support is provided by wear strip 92a on the exterior of the hose. For retractable and collapsible hose 90b, radial support is provided by wire reinforced wear strip 92b on the exterior of the hose. For retractable and collapsible hose 90c, radial support is provided by a coiled wire 92c on the interior of the hose and a wear strip 92a on the exterior. For collapsible hose 100, radial support can be provided by the convolutions in inner elastic hose 104. For collapsible hose 100a, radial support can be provided by the corrugations in inner elastic hose 105. For collapsible hose 110, radial support is provided by wear rings 115 and/or 115a on the exterior of the hose. For collapsible hose 120, radial support can be provided by wear rings 125 on the exterior of the hose and/or support rings 125a mounted on the interior of hose 120. Note that either interior or exterior radial support structures can be used with any of the hose body designs presented here and many other shapes and sizes of radial support structures are possible.

Figure 3A:
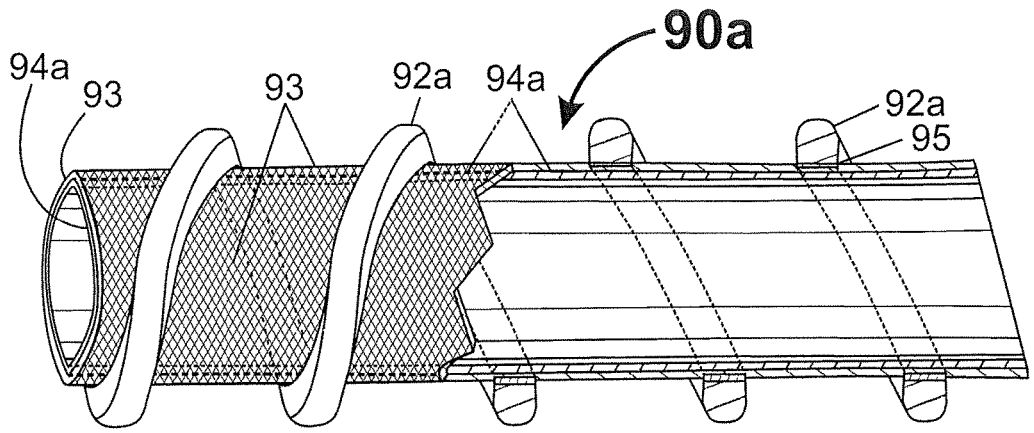
FIG. 3A Perspective/section view of a collapsible hose with helical wear strip to prevent radial collapse of the collapsible hose.
Figure 3B:
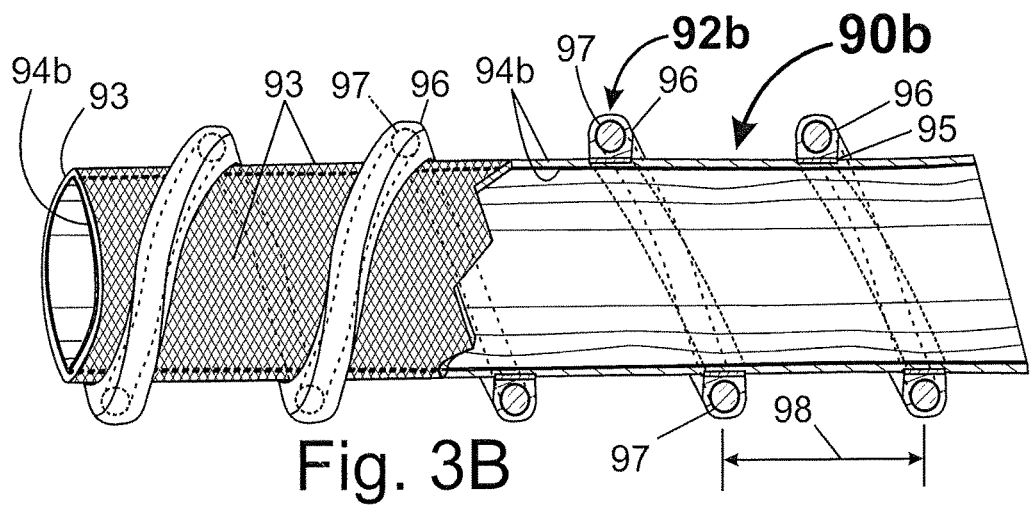
FIG. 3B Perspective/section view of a collapsible hose with helical wire coil and wear strip to prevent radial collapse of the collapsible hose.
Figure 3C:
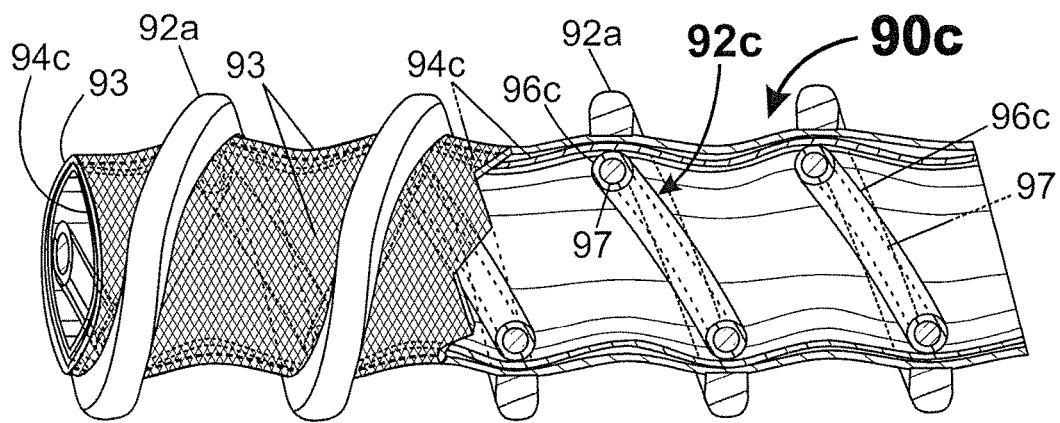
FIG. 3C Perspective/section view of a collapsible hose with an interior helical wire coil to prevent radial collapse of the collapsible hose.

In FIGS. 3A through 3C we see three examples of collapsible hoses 90a-c, respectively. In each example an inner hose 94a, 94b or 94c provides a very thin water-proof and air-tight hose structure that is also very tough and durable. Collapsible hose 90b comprises an outer cover 93 infused with a flexible polymer material 94b which can be similar to that used in other inner hoses to make the fabric outer cover 93 water-proof and/or air-tight. Inner hoses 94a and 94c can comprise a partially attached or loose polymer layer which can be reinforcement if desired (e.g. woven fibers, knitted fibers, braided fibers, fiber mesh, random fibers, strain strengthened polymer layers, etc.). Such inner hose reinforcement, however, may limit the stretchability of the inner hoses, and so will preferably be used only in designs in which the inner hose only needs to flex and fold, not stretch significantly. Thus the addition of a thin reinforcement layer bonded to inner hoses 94a and 94c can make these inner hoses stronger, tougher, and more durable. Outer covers 93, as well as, outer covers 103, 113, and 123 can comprise a tough woven, knitted, or braided tube that provides the majority of radial and longitudinal support for the collapsible hose. These outer covers 93, as well as, outer covers 103, 113, and 123, can comprise fibers or yarns made of high strength fibers, such as, nylon, polyester, polypropylene, rayon, etc.

In FIG. 3A we see collapsible hose 90a comprising an outer cover 93, an inner hose 94a and a helical wear strip 92a bonded to outer cover 93 with bonding strip 95. Inner hose 94a can comprise any of a number of durable and flexible polymers such as TPU (Thermal Plastic Urethane), TPR (Thermal Plastic Rubber), polypropylene, vinyl, and many other polymers. In this example, inner hose 94a is completely bonded to the interior of outer cover 93. This bonding of inner hose 94a to cover 93 can include melting inner hose 94a partially into the fibers of outer cover 93. In alternate designs, inner hose 94a can be completely infused into outer cover 93 during manufacturing to form a single layer air-tight and water-tight reinforced hose (see FIG. 3B), with the material comprising inner hose 94a filling the gaps between the fibers in outer cover 93. Wear strip 92a is bonded to outer cover 93 with bonding strip 95 to provide wear protection for outer cover 93, as well as, provide radial support for the collapsible hose. In alternate designs, wear strip 92a can be bonded directly to outer cover 93 through thermal bonding or other bonding methods.

In FIG. 3B we see collapsible hose 90b comprising inner hose material 94b, outer cover 93, and a helical wire reinforced wear strip 92b. Inner hose material 94b can comprise a polymer material that can be infused into outer cover 93 to form a water-proof and/or air-tight hose. Helical wear strip 92b is shown bonded to inner hose material 94b (and/or outer cover 93) with bonding strip 95. Inner hose material 94b can comprise any of a number of durable and flexible polymers such as TPU (Thermal Plastic Urethane), TPR (Thermal Plastic Rubber), polypropylene, vinyl, and many other polymers that can make outer cover 93 waterproof and/or air-tight. In this example, sealing hose material 94b can start out as polymer layer 94a previously discussed, which is then melted into outer cover 93. This melting or infusing of inner hose 94a material into cover 93 can alternatively be done by cross-extruding outer cover 93 through a crosshead extruder die designed for that purpose. Wire reinforced wear strip 92b comprises spring wire 97 and a wear cover 96. Coiled wire 97 can provide a bias to help retract and/or extend the collapsible hose 90b. However, it should be understood that, when the techniques described here are applied so that a hose can be retracted and extended using pressure differentials (e.g., retracting by lowering pressure below ambient and extending through increasing pressure above ambient, such as described in the context of FIGS. 1A-2C) mechanical biasing such as could be provided by coiled wire 97 may be omitted. Alternatively, such mechanical biasing might be provided at a low enough strength, or might be provided to cause the hose to assume a length between its extended and retracted lengths, that pressure differentials as described previously would be required to bring the hose to its fully retracted or extended lengths. Coiled wire strip 92b can be bonded directly to outer cover 93 (and/or inner hose material 94b) by thermal bonding of wear cover 96 to outer cover 93 and/or inner hose material 94b. Wire wear strip 92b is shown bonded to inner hose material 94b with bonding strip 95. Wear cover 96 provides wear protection for wire 97. Note that, while the coil pitch 98 depicted in FIG. 3B, for which the collapsible hose 90b can be at its natural length, is about the same as the diameter of hose 90b. Using the teachings of this disclosure, the coil pitch can be increased significantly beyond the diameter of the hose, with any decrease in the suitability of the coil for providing a retracting bias caused by the increase in coil pitch being accounted for by alternative approaches to providing a retracting force (e.g., using a negative pressure differential, such as described in the context of FIGS. 1A-2C). Similarly, wire 97 can be reduced in cross-sectional diameter which also decreases the suitability of the coil for providing a retracting biasing capable of substantially retracting the hose without assistance from alternative approaches to providing, while still providing support to resist radial collapse.

In FIG. 3C we see collapsible hose 90c comprising an outer cover 93, an inner hose 94c and a helical wire coil 92c, and wear strip 92a. Inner hose 94c can be similar to inner hoses 94a and 94c, and comprise any of a number of durable and flexible polymers such as TPU (Thermal Plastic Urethane), TPR (Thermal Plastic Rubber), vinyl, and many other polymers. In this example, inner hose 94c does not need to be bonded to the coiled wire 92c, but can be if desired Inner hose 94c can be bonded to outer cover 93 in multiple places between the coils of wire 92c to assist in the folding of outer cover 93 when hose 90c is collapsing. However, outer cover 93 does not need to be bonded to inner hose 94c, and it should be understood that bonding between inner hose 94c and outer cover 93 is optional. Nevertheless, preferably, inner hose 94c is substantially bonded to cover 93, so that outer cover 93 can provide radial support for inner hose 94c in addition to whatever radial support is provided by the other components shown in FIG. 3C (e.g., coils of wire 92c). Wear strip 92a seen on collapsible hose 90c can be the same as wear strip 92a seen in FIG. 3A. Wear strip 92a can be bonded directly to outer cover 93 by thermal bonding. Wear strip 92a provides wear protection for outer cover 93, as well as providing additional radial support for collapsible hose 90c. In alternate designs, wear strip 92a can be bonded to outer cover 93 with adhesives or other bonding methods.

In FIG. 3C, alternate designs of collapsible hose 90c can comprise a hose body (outer cover 93 and inner hose 94c) that is substantially cylindrical like those seen in FIGS. 3A-B. Vacuum or suction pressure can pull the hose body inward radially to cause the collapsible hose fold and retract the hose body to a compact length. In such a substantially cylindrical design, wear strip 92a can be reduced or eliminated since the entire length of the hose can lay flat against a wearing surface to provide a lower contact pressure that is spread out over outer cover 93, instead at a few high pressure points on the ridges of a convoluted or corrugated hose. Coiled wire 92c would then provide the majority of radial support for the hose to resist radial collapse due to vacuum suction forces during retraction of the hose. Also in FIG. 3C, outer cover 93 and inner hose 94c can be bonded together across substantially their entire contact surface, or outer cover 93 infused with inner hose. This allows vacuum pressure to pull both inner hose material 94c and outer cover 93 radially inward at the same time to assist in folding and retracting the hose.

Figure 4A:
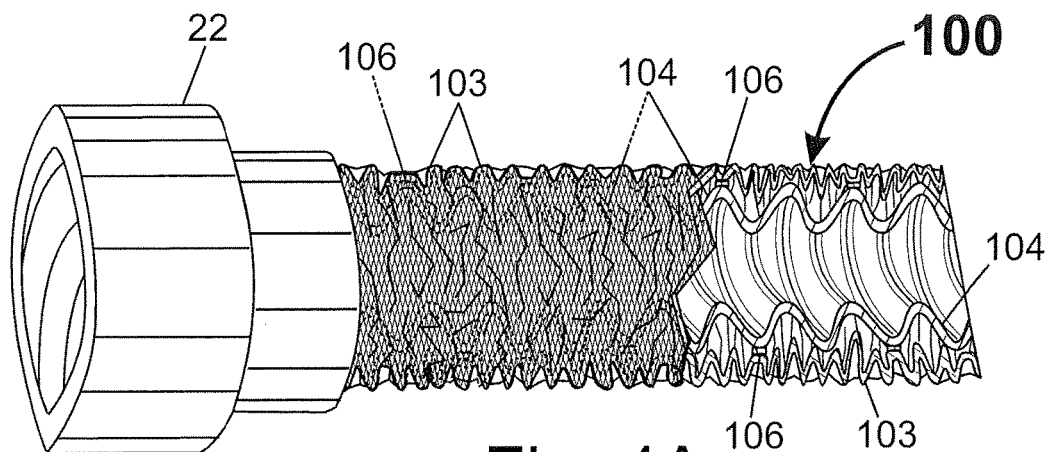
FIG. 4A Perspective/section view of a collapsible hose with a convoluted elastic inner hose to prevent radial collapse of the collapsible hose.

In FIG. 4A we see collapsible hose 100 comprising an inlet connector 22, an outer cover 103, a convoluted inner elastic hose 104 and a bonding adhesive strip(s) 106. In alternate designs, adhesive strip 106 can take the form of multiple patches or pads that bond the elastic hose to the outer cover. Inlet connector 22 is designed to attach to a suction supplying input connector that can be similar to fluid control systems 51, 61, 71, 81 and/or 151, to provide retracting suction force to (fully) retract collapsible hose 100. Inner hose 104 can be made of a highly elastic material, such as, TPU (Thermal Plastic Urethane), TPR (Thermal Plastic Rubber), natural rubber, silicone elastomers, and many other elastomers. The elastic properties of inner hose 104 allow it to stretch longitudinally when hose 100 is extended by pressure. When internal pressure is applied to inner hose 104, inner hose 104 would first tend to expand by straightening the convolutions. Further, even after the convolutions are straightened, a hose such as shown in FIG. 4A may be capable of further extension, such as through stretching the inner hose 104 (which additional expansion may require an increase in fluid pressure greater than the increase which would be used to extend the hose by straightening its internal convolutions). Similarly, even when the convolutions of a hose such as shown FIG. 4A are allowed to assume their natural shape (e.g., as shown for a hose at its natural length in FIG. 4A), further retraction may be possible by applying vacuum pressure to inner hose 104, substantially forcing the convolutions of inner hose 104 together, and further collapsing hose 100 longitudinally. This can provide a hose which would be capable of significant expansion both with and without stretching of the inner hose 104. For example, if a hose such as shown in FIG. 4A could extend by a factor of two from the position seen in that figure by straightening the convolutions of the inner hose 104, and could be collapsed to less than half the length of the position shown in FIG. 4A through the application of vacuum pressure, it is possible that collapsible hose 100 can extend to four times its fully retracted length before it needs to significantly begin stretching the elastic material that comprises inner hose 104. Further, when additional extension made possible by stretching the elastic material of the inner hose 104 is accounted for, a hose such as shown in FIG. 4A could have an extended to retracted length ratio of ten-to-one or more. That is, a hose with interior convolutions (e.g., hose 100) could be constructed to extend by about 4× (four times) from its fully retracted length simply by unfolding its convolutions, then the elastic nature of inner hose 104 can stretch by another factor of 2.5× (two and one-half times) for a total longitudinal expansion of 10× (ten times). A collapsible hose (e.g., hose 100a) with corrugated inner elastic hose 105 can have similar expansion ratios for the same reasons.

In FIG. 4A, bonding adhesive strip(s) 106 is/are shown bonding the ridge of convoluted inner hose 104 to outer cover 103. To accommodate the retraction and expansion of the hose (e.g., the 10× retraction described above), adhesive strip(s) 106 can have a significant radial thickness (distance between bonding points on ridge of inner hose 104 and outer cover 103), which can provide space for outer cover 103 to fold up and collapse longitudinally. In the design shown, inner hose 104 already has a significantly smaller outside diameter than the inside diameter of outer cover 103. This spacing allows cover 103 to fold and collapse to a retracted state. Of course, it should be understood that, while outer cover 103 can be bonded to inner hose 104, this is not necessary for hoses with convoluted inner hoses or other types of hose designs illustrated herein. For example, in designs with a convoluted inner hose, it is possible that the ridges on inner hose 104 may have a large enough diameter and sufficient friction to hold the inner hose in place with respect to outer cover 103 without requiring further bonding. Similarly, a convoluted inner hose 104 can comprise a protrusion similar to adhesive strip 106 that is actually integral with inner hose 104 and molded on its ridge (that is inner hose 104 is manufactured with a protruding strip on its ridge). This protrusion can then be used to either bond to the interior of outer cover 103 or to create friction against outer cover 103 to hold inner hose 104 and outer cover 103 in position with respect to each other and prevent damage to inner hose 104. A wear strip similar to wear strip 92a can be used to provide wear protection for outer cover 103, as well as, provide additional radial support for collapsible hose 100.

Figure 4B:
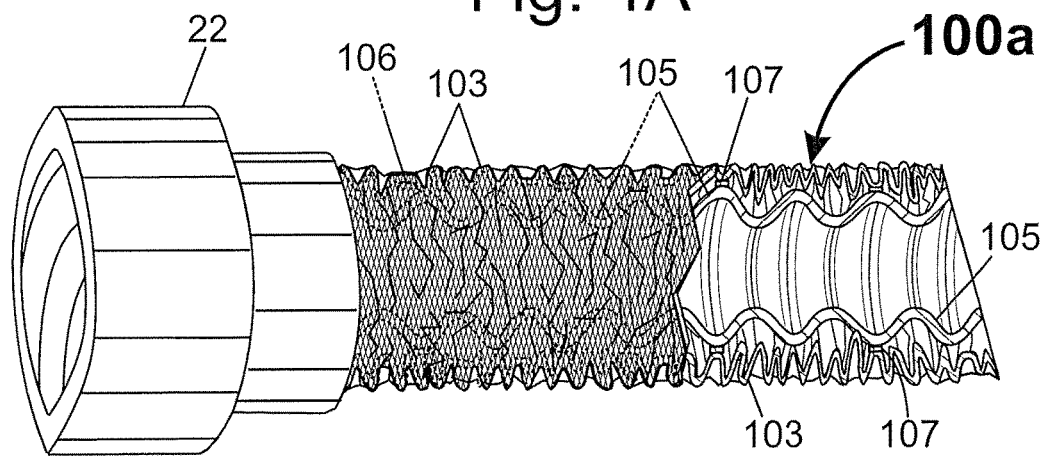
FIG. 4B Perspective/section view of a collapsible hose with a corrugated elastic inner hose to prevent radial collapse of the collapsible hose.

In FIG. 4B, bonding adhesive rings and/or pads 107 are shown bonding every other ridge of corrugated inner hose 105 to outer cover 103. Rings and/or pads 107 can comprise a thin layer of adhesive, or comprise a pad or strip structure with a significant thickness. To accommodate the retraction and expansion of the hose (e.g., the 10× retraction described above), adhesive pads/strips 106 and/or adhesive rings 107 can have a significant radial thickness (distance between bonding points on ridges of inner hose 105 and outer cover 103), which can provide space for outer cover 103 to fold up and collapse longitudinally. As described in the context of FIG. 4A, while in the design of FIG. 4B, outer cover 103 can be bonded to inner hose 105, but this is not a necessary feature. For example, in designs with a corrugated inner hose 105, it is possible that the corrugated inner hose may have a large enough ridge diameter and sufficient friction to hold itself in place with respect to outer cover 103. Similarly, inner hose 105 can comprise a plurality of ring shaped protrusion on the ridges of its corrugations that are integral with the inner hose 105. Such ring shaped protrusions can be similar in shape to adhesive rings 107 and may be molded into inner hose 105 during manufacturing. In cases where they are present, ring shaped protrusion at the top of the ridges on inner hose 105 can then be used to either bond inner hose 105 to the interior of outer cover 103 or to create friction against outer cover 103 to hold inner hose 105 and outer cover 103 in position with respect to each other and prevent damage to inner hose 105. Wear rings similar to wear rings 115 (see FIG. 4C) can be used to provide wear protection for outer cover 103, as well as, provide additional radial support for collapsible hose 100a.

Figure 4C:
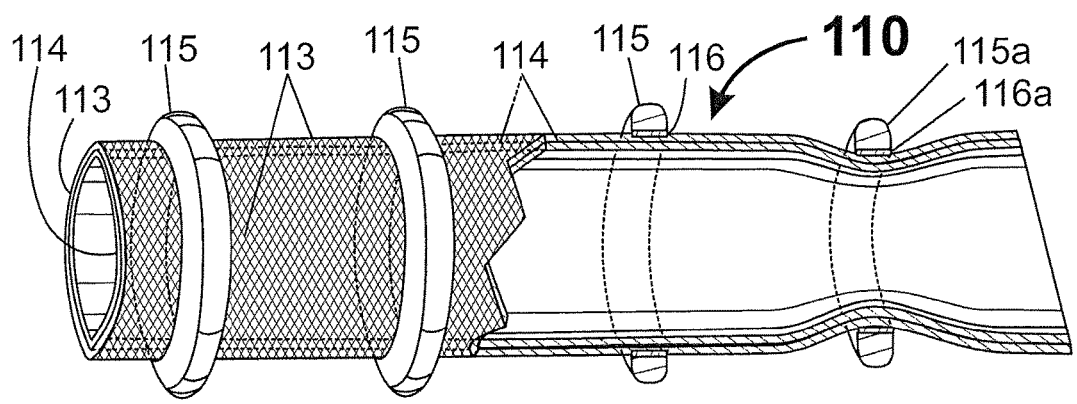
FIG. 4C Perspective/section view of a collapsible hose with a straight or corrugated thin walled hose with ring shaped supports to prevent radial collapse of the collapsible hose.

In FIG. 4C, we see collapsible hose 110 comprising an outer cover 113, an inner hose 114, and a plurality of bonded radial support wear rings 115 and 115a. Outer cover 113 and inner hose 114 can be bonded together or integral with each other to form a reinforced and sealed hose or conduit. Support rings 115 and 115a are bonded to outer cover 113 and/or inner hose 114 either directly or indirectly with bonding adhesive rings 116 and 116a, respectively. If outer cover 113 were woven with corrugated valleys like that seen near support ring 115a, that shape can help hold rings 115a in place. In such an implementation, bonding rings 116 and 116a may be used to transfer the radial support provided by support rings 115 and 115a, respectively, to inner hose 114 and prevent hose 114 from collapsing radially when vacuum pressure is applied to the interior of hose 114. This can be achieved by bonding the support rings 115 and 115a to the inner hose 114 and/or by bonding the support rings 115 and 115a to the outer cover 113 (e.g., if inner hose 114 is itself bonded to outer cover 113). Alternatively, support rings 115 and 115a can provide similar radial support by being placed inside inner hose 114 and outer cover 113 as seen in FIG. 5A with interior support ring 125a.

Figure 5A:
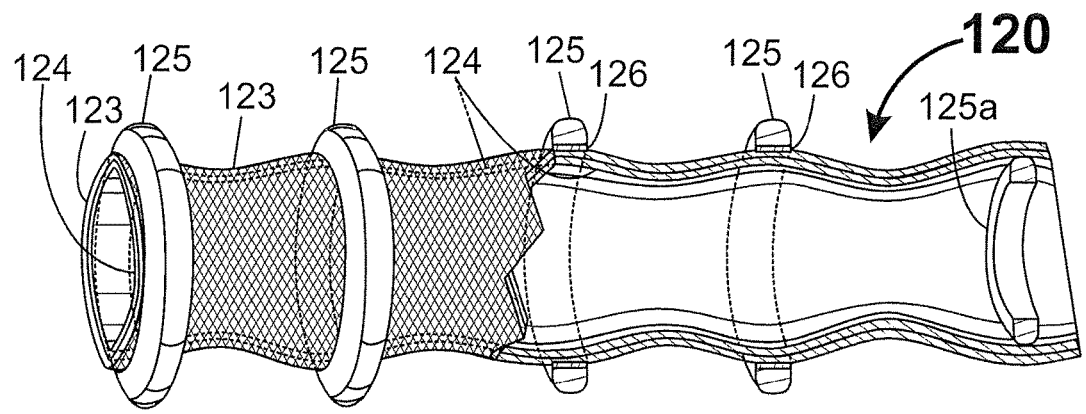
FIG. 5A Perspective/section view of a collapsible hose with a corrugated thin walled hose structure with ring-shaped supports on the interior or exterior to prevent radial collapse of the collapsible hose.

In FIG. 5A, we see collapsible hose 120 comprising an outer cover 123, an inner hose 124, and a plurality of support rings 125 and 125a. Hose 120 can be very similar to hose 110 seen in FIG. 4C, but with a corrugated shape to assist in the longitudinal collapse of the hose. Outer cover 123 and inner hose 124 can be bonded together or integral with each other to form a reinforced and sealed hose or conduit that is water-proof and/or air-tight. Exterior support rings 125 can be bonded to outer cover 123 and/or inner hose 124 with bonding adhesive rings 126. Interior support rings 125a can be bonded to the interior of inner hose 124 as needed. However, rings 125a may not need bonding to the interior of inner hose 124 if the shape of outer cover 123 is sufficiently corrugated to hold rings 125a in place during use. Even if support rings 125a are used on the interior of hose 120 for radial support, exterior rings 125 can still be used as wear rings to protect outer cover 123 and inner hose 124 from wear damage. When fully collapsed, or stowed, rings 125 can be pulled next to each, and thus provide protection for outer cover 123 and inner hose 124 from physical and ultraviolet damage.

In FIGS. 5B through 7B, we see various examples of collapsible hoses and fluid control systems that can be used for a firefighting hose (though they could also be used in other than firefighting contexts, such as for home use). Such firefighting hoses can be mounted to fire trucks and deploy nearly instantly once they reach a fire. Normally, fire hoses are two inches in diameter or larger (though one and one-half inch hoses are often used for demonstrations or small fires), and this large diameter results in the hoses being very heavy once filled with water. To account for this, the designs shown in FIGS. 5B through 7B include a compressed gas or compressed air system which can be used to extend a collapsible fire hose without adding significant weight to the hose. Using this type of compressed air system, an extendable fire hose can remain light and easy to drag to a fire. Once in position, pressurized fire suppressant fluid (e.g. water, water plus fire retardants, foam, etc.) can be pumped into the fire hose and used to fight fires. After finished, compressed air can again be used to force or push out the majority of the fire suppressant fluid from the collapsible hose, making it light weight and easy to handle again. Then a suction pump can be used to collapse the fire hose longitudinally and return it to the fire truck for stowage. Thus, a longitudinally collapsible fire hose can have three distinct supply connections: 1) a supply of pressurized firefighting fluid (e.g. pressurized water), 2) a supply of compressed gas (e.g. compressed air), and 3) a supply of suction pressure (e.g. vacuum pressure).

Figure 5B:
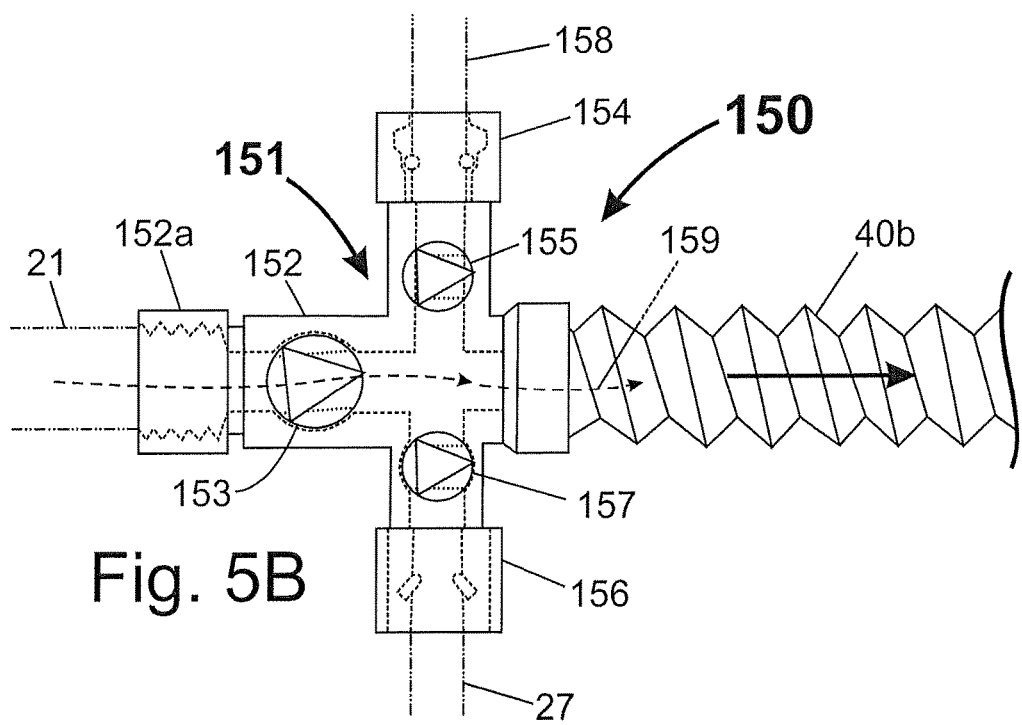
FIG. 5B Three port input connector control system for a collapsible hose.

In FIG. 5B, we see collapsible fire hose system 150 comprising a collapsible fire hose 40b connected to fluid control system 151. Fire hose 40b can be similar to any of the collapsible hose designs described herein, though it would tend to be larger in diameter than most consumer hoses. Hose 40b would also tend to be made of materials that are fire and heat resistant just like presently used fire hoses. Fluid control system 151 can comprise a housing 152, a pressurized fluid supply connector 152a (fire suppressant), a fluid supply valve 153, a compressed air connector 154, a compressed air valve 155, a suction supply connector 156, and a suction supply valve 157. Pressurized fluid connector 152a is designed to connect to pressurized fluid source 21 to supply hose 40b with a pressurized fire fighting fluid (e.g. water, etc.). Compressed air connector 154 is designed to connect to a compressed air source 158 to supply hose 40b with compressed air. Suction supply connector 156 is designed to connect to a vacuum pressure source to supply hose 40b with below ambient suction pressure. Valve 153 can control the flow of pressurized fluid to hose 40b. Valve 155 can control the flow of compressed air to hose 40b. Valve 157 can control the suction pressure communicated to hose 40b. Each of these three functions (supplying pressurized fluid, pressurized air, and suction pressure) can be applied as needed with valves 153, 155, and 157, though it should be understood that valves 153, 155, and 157 are optional components, and may be omitted from some implementations (e.g., when the equipment supplying the pressurized fluid, the compressed gas, and suction pressure includes the appropriate control valve or valves). Thus, fluid control system 151, can be designed to connect to controllable supplies of pressurized fluid, pressurized gas and suction pressure so that valves 153, 155, and 157, respectively, are located back further with the supply equipment. In FIG. 5B, fluid control system 151 is shown with main source valve 153 "open", compressed air valve 155 "closed", and suction valve 157 "closed" which allows fluid material to flow from pressurized fluid source 21 to hose 40b along path 159. Notice that this design in FIG. 5B is functionally the same as the collapsible fire hose systems seen in FIGS. 6, 7A, and 7B, except for the layout of the valves and the storage tube designs used to store and protect the collapsible fire hose, and in some cases provide an actuation cylinder for lengthening the effective length of the collapsible hose.

Figure 6:
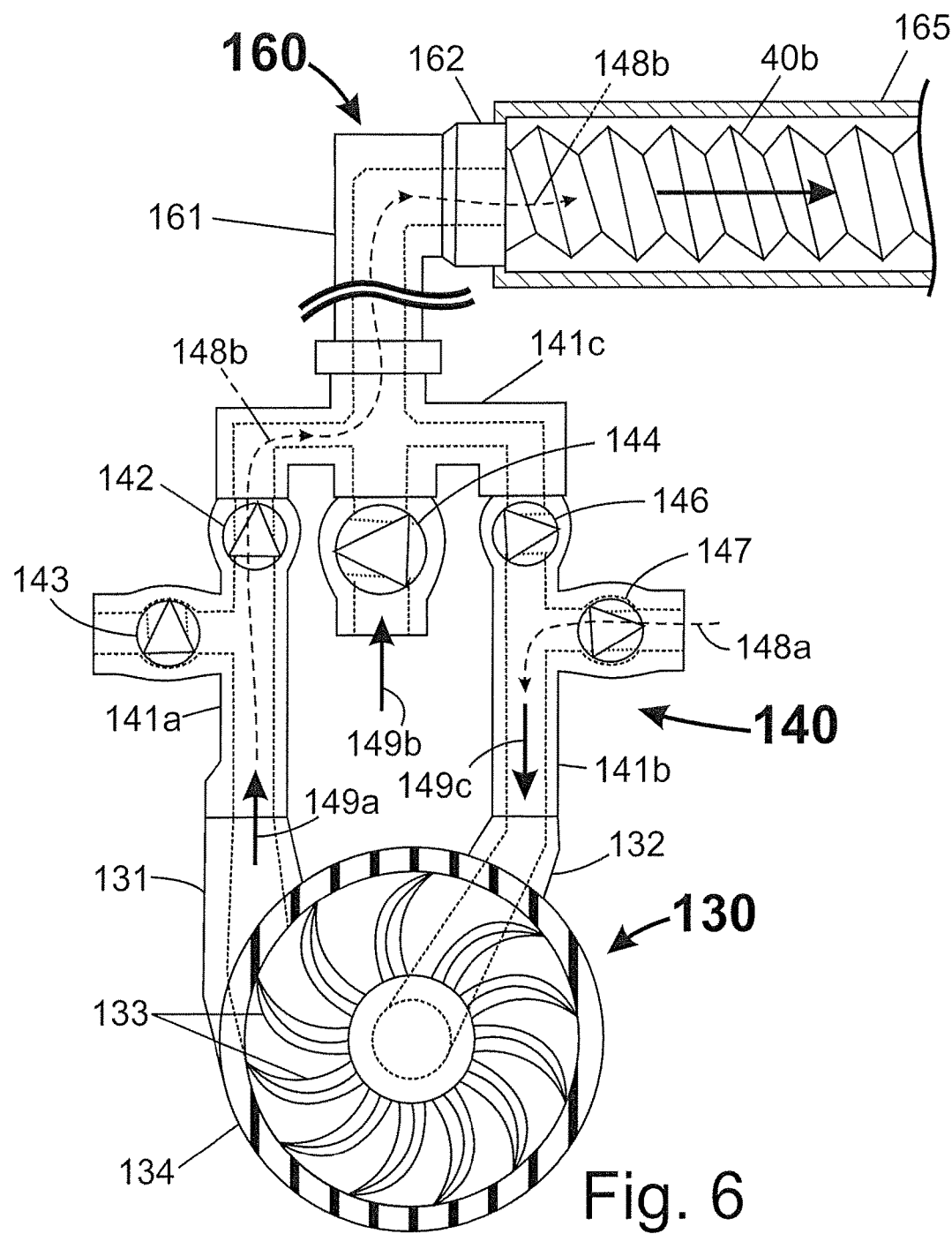
FIG. 6 Extendible and retractable large hose system. With single pump providing both compressed air, and vacuum suction for water and/or air mixtures.
Figures 7A, 7B:
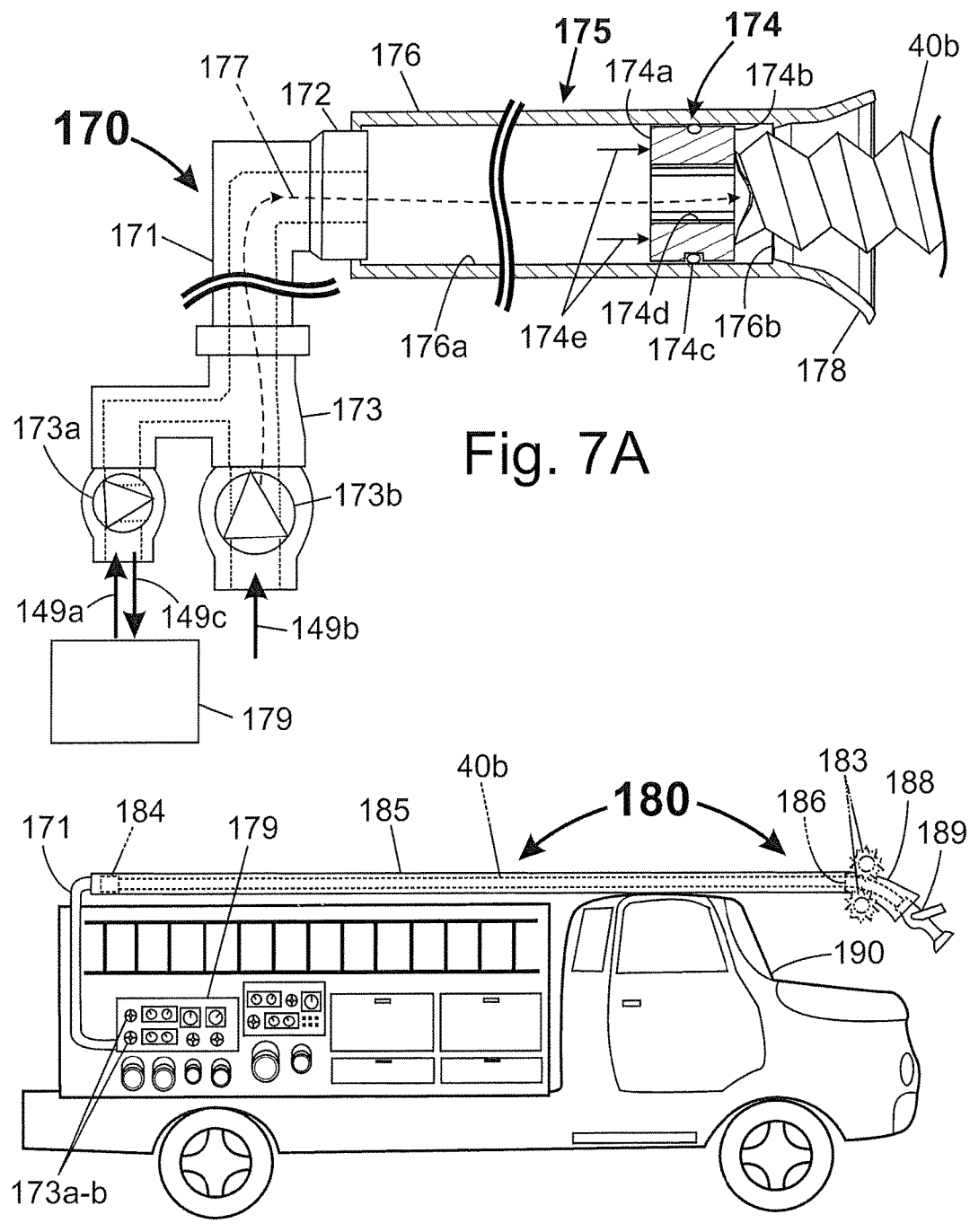
FIG. 7A Extendible and retractable large hose system with slidable hose and piston.
FIG. 7B Extendible and retractable large hose system mounted on fire truck.

In FIGS. 6, 7A and 7B, we see three examples collapsible fire hose systems 160, 170 and 180 respectively. In these designs, we see collapsible hoses 40b that are extendible and retractable with water and/or gas pressure, and suction vacuum pressure, respectively. Fluid pressure above and below ambient pressure is used in these extendible and retractable hoses to provide biasing. However, other biasing structures, such as wire coils and elastic hoses can still be used in combination with the fluid pressure biasing to provide some mechanical biasing means, though such additional mechanical biasing structures are not required. Thus, the hoses that are referred to in FIGS. 6 through 7B can be similar to the other collapsible hoses discussed herein. It should also be noted that vacuum pressure within a longitudinally collapsible hose can generate significant greater retracting forces than a spring or even elastic biased hose, especially in larger diameter hoses. Further, the presented longitudinally collapsible hoses can have very little mechanical biasing when extended so they do not tend to retract by themselves if fluid pressure suddenly drops to zero. This is important in fire fighting since the large hose diameters with elastic biasing might pull the firefighter off their feet if pressure suddenly dropped and the elastic biasing began forcefully retracting the hose.

In FIG. 6 we see an extendible and retractable fire hose system comprising a collapsible fire hose assembly 160, a pumping system 130 and a manifold valve assembly 140. Manifold assembly 140 connects pumping system 130 and pressurized water supply 149b (fire suppressant) to fire hose assembly 160. Fire hose assembly 160 comprises a connector tube or pipe 161 with a hose connector 162 on one end, a storage tube 165 and a collapsible fire hose 40b. Fire hose 40b is connected at one end to hose connector 162 so that fluids flowing in pipe 161 and manifold 141c can be directed through the interior of hose 40b. Storage tube 165 is designed to hold and protect hose 40b when it is fully retracted. Thus, storage tube 165 is designed with a length that is approximately the same as fire hose 40b when fully collapsed. The right end of extendible fire hose 40b (not shown off page) can be adapted to connect to a water nozzle similar to spray nozzle 189 seen in FIG. 7B for controlling the application of the fluid flowing through extendible hose 40b. Fluid pump 130 is shown comprising an input port 132, an output port 131, a pumping turbine 133 and a turbine housing 134. Pump 130 is shown here to facilitate the readers understanding of the function of valving system 140 (manifold), since most people understand how rotary pumps can suction fluids and/or gasses from its input port and expel pressurized fluids at its output port. Rotary pumps, like pump 130, can be designed to handle both gases and/or liquids and can be self priming (pulls a vacuum at its input port). Thus in this design, rotary pump 130 is designed to both create a suction vacuum at input port 132 and pump liquids and gasses into output port 131 to retract and extend collapsible hose 40b, respectively, at a predetermined rate.

In FIG. 6, manifold 140 comprises a pressurized manifold portion 141a, a suction manifold portion 141b, a main manifold portion 141c and a fire suppression fluid valve 144. Pressurized manifold 141a comprises controllable valves 142 and 143 and receives pressurized fluid 149a (e.g. compressed air) from pump 130. Depending on the settings of the other valves and the type of fluid flowing along flow path 148a, a separate pressurized fluid source 149b may be supplied to main manifold 141c at valve 144. Suction manifold 141b comprises controllable valves 146 and 147 and can create a suction fluid flow within the manifold in the direction shown by arrow 149c through pump 130. Pump 130 is used here to provide pressurized fluid and suction pressure to extend and to retracted collapsible hose 40b, respectively. As shown in FIG. 6, with valve 142 "open", valve 143 "closed", valve 144 "closed", valve 146 "closed" and valve 147 "open", then air can be sucked into suction manifold 141b, along path 148a, be compressed by pump 130 and flow into pressure manifold 141a along path 148b to pressurize and extend collapsible hose 40b. With different valve settings, fire suppressing fluid can be supplied to hose 40b to fight fires through valve 147, or vacuum pressure can be supplied to hose 40b for retracting the hose into its protective storage tube 165 by closing valve 147 and opening valve 146. The fire suppressing fluid supply 149b can have a much larger flow rate than is needed for extending and retracting hose 40b. Thus, pump 130 can be relatively small compared to the pumping system (not shown) used to pressurize fire suppressant fluid supply 149b. In modern fire trucks, the fire truck's engine is used to drive a large pump to increase the water (fire suppressant) pressure and flow rate going to the fire hose(s). This is done to increase the supply of water and other fire suppressants to the fire hoses during use. If a non-pumping fire truck is used, the municipal water pressure can be used directly through valve 144 to supply water to hose 40b.

In alternate designs, the main fire suppressant pump can be modified to provide not only the fire suppressant (water, etc.), but also compressed air and vacuum pressure provide extending and retracting control. For example, in FIG. 6, if pump 130 were enlarged to supply the flow volume needed for the fire suppressant, this suppressant could flow along path 148a, through pump 130 and then out along flow path 148b (the same path as compressed air or gas). Suppressant valve 144 would no longer be needed as valve 147 could be designed to provide both gasses and liquids to be pumped by pump 130. In another alternative design, a third valve below valve 147 on manifold 141b could be used to supply the suppressant fluid, while valve 147 could be used for supplying air.

In FIG. 7A we see extendible and retractable fire hose system 170 comprising a collapsible fire hose assembly 175, a pumping system 179, two valves 173a-b, a main manifold 173 and connecting tube 171. Manifold assembly 173 connects pumping system 179 and fire suppressant supply 149b to fire hose assembly 170. Fire hose assembly 175 comprises an outer storage tube 176, a movable hose piston 174 and a collapsible hose 40b. Connector tube or pipe 171 fluidly connects manifold 173 to fire hose assembly 175 at hose connector 172. Hose piston 174 comprises a back face 174a, a front face 174b, sealing gasket 174c and a center passageway 174d. Collapsible hose 40b is attached directly to hose piston 174 so that fire suppressant fluid can flow through passageway 174d and hose 40b. Storage tube 176 is connected to pipe 171 at connector 172 so that fire suppressant fluid can flow along flow line 177 from input valve 173b, through pipe 171, into storage tube 176 through passageway 174d and into collapsible fire hose 40b. Storage tube 176 comprises an inner cylinder wall 176a for engaging and sealing against gasket 174c, a piston stop 176b for stopping piston 174 at the open end of tube 176, and a flared end 178 for guide hose 40b in and out of tube 176 during retraction and extension, respectively. Compressed air and vacuum system 179 supplies compressed air to extend hose 40b and to slide piston 174 against stop 176b. Compressed air and vacuum system 179 supplies vacuum suction to retract hose 40b and slide piston 174 against connector 172. Compressed air and vacuum system 179 can comprise a pumping system similar to pump 130 and manifold system 140 seen in FIG. 6, but substantially combines the functions of valves 142 and 146 into one valve 173a to provide all three fluid types to manifold 173.

In FIG. 7B we see a fire truck 190 with an extendible and retractable fire hose system 180 that is similar to collapsible fire hose assembly 170 seen in FIG. 7A. High pressure water flow 149b (fire suppressant) can be supplied by the normal water pump systems found on fire trucks through valve 173b and manifold 173. Alternatively, manifold system 140 (seen in FIG. 6) can also be used to insert high pressure water through valve 144. In FIGS. 7A-B, valves 173a and 173b can be used to select between compressed air or suction air from pump system 179 and fire suppressant fluid from the fire engine's standard pumps. Storage tube 185 with piston 184 and hose stop 186 can be similar to storage tube 176, piston 174, and hose stop 176b, but has an angled end 188 to allow it to feed hose 40b easily off the top of fire truck

190. Storage tube 176 has a more straight design for mounting closer to the ground. Spray nozzle 189 is attached to the end of fire hose 40b and can be mounted on the end of storage tube 185 when not in use (as shown). Alternatively, spray nozzle 189 can be mounded further inside angled end 188 to more protect it from the elements. Also in alternate designs, mechanical methods can be used to retract the collapsible hose when finished. For example, a pair of powered rollers 183 can be used to mechanically grip collapsible hose 40b and drag it back into storage tube 185 in place of vacuum pressure. In another alternate design, powered rollers 183 can supplement the retracting force generated by vacuum pressure and assist in retracting the hose fully inside storage tube 185. Rollers 183 can comprise a soft material that can grip hose 40b without damaging it. In alternate designs, a pair of powered friction belts can replace rollers 183 to engage hose 40b and provide force for extending and/or retracting the hose 40b.

Fluid control systems, such as systems 51, 61, 71 and 81 shown in FIGS. 1A through 2C, can be manufactured in a number of ways. These systems can be injection molded as a single piece or as multiple pieces that can be bonded together similar to other injection molded products. These systems can also be machined in plastic or metal. These systems can also be cast and then later machined to tolerance. If these fluid control systems are injection molded then they can be injection molded onto the end of hose 40a to form a secure bond. The valves and connector ports can then be assembled using techniques such as are often applied to prior art valves and connectors. In FIGS. 2A-C, one alternative construction can be to form a venturi nozzle where channel 83b is located on valve 83 to spray fluid directly into throat 87 to create suction (throat 87 would need to be repositioned to properly accept fluid sprayed from this valve mounted venturi nozzle). Because of the complex nature of housing 82 it can be injection molded in two halves that separate approximately where sectioned in FIGS. 2A-C. These two halves can then be bonded with adhesives, solvents, ultrasonic welding or other bonding methods.

Collapsible hose 90a shown in FIG. 3A can be manufactured in a number of ways. First, cover 93 and inner hose 94a can be manufactured separately and then assembled and bonded together by any number of available bonding methods. In a second process, wear strip 92a can be bonded to the exterior of outer cover 93. Second, inner hose 94a can be extruded and expanded with air pressure against outer cover 93 as it is being woven. Combining the weaving of cover 93 with the extrusion of inner hose 94a allows the extruder to be positioned where it can extrude into the interior of outer cover 93. Air pressure can then be used to expand the hot extruded inner hose 94a against the interior surface of outer cover 93 and thermally bond it to cover 93. The strength of this bond can be controlled by the extrusion material selected, the temperature of the extruded inner hose, the material outer cover 93 is made of or coated with, etc. After this bonding is completed, wear strip 92a can be wrapped around the extended hose and bonded to outer cover 93 through adhesives or thermal bonding.

Retractable hose 90b shown in FIG. 3B can be manufactured in a number of ways. First, cover 93 can be cross extruded with material 94b to form a coated reinforced hose, and then adhesives and/or thermal bonding can be used to bond wire coil 92b to reinforced outer cover 93 and/or sealing material 94b. A second manufacturing method can use a pre-manufactured outer cover 93 coated with inner hose material 94b (polymer matrix), and bonding wire coil 92b to hose material 94b. Optional bonding strip and/or pads 95 can be used to hold wire coil 92b in place against inner hose material 94b. The adhesive strip and/or pads 95 can be activated thermally or by other activation means (e.g. chemical, radiation, microwaves, etc.).

Retractable hose 90c shown in FIG. 3C can be manufactured in a number of ways. A first method for manufacturing retractable hose 90c can begin with outer cover 93 and inner hose 94c being manufactured separately and then assembled and/or bonded together. Alternatively, inner hose 94c can be extruded at the same time outer cover 93 is woven so that inner hose 94c expands inside cover 93. As inner hose 94c can be hot when extruded, it is possible that a process for manufacturing a hose such as shown in FIG. 4C can include bonding the inner hose to the outer cover using the heat generated by the extrusion process itself, if the outer cover 93 and inner hose 94c are made of thermally bondable material. Of course, if should be understood that additional heat or adhesives could also be used to achieve such bonding, rather than simply relying on the heat which will inherently be generated by the extrusion of inner hose 94c. Coiled wire 92c (with or without optional protective cover 96c) can be made separately with a coiled diameter slightly larger than the diameter of inner hose 94c. To insert coiled wire 92c into inner hose 94c, the coiled wire 92c can be twisted to temporarily shrink its diameter so that it can be inserted inside the inner hose 94c and/or outer cover 93. After wire coil 92c is inserted, it is allowed to untwist to the extent possible given the resistance to the wire's expansion which will be provided by cover 93, which can give retractable hose 90c a slightly convoluted shape. When hose 90c is longitudinally retracted, wire coil 92c can cause bulges in outer cover 93 that can be easily identified for bonding wear strip 92a to the ridge of outer cover 93. Heat from extruding wear strip 92a or pressing wear strip 92a into cover 93 can also bond cover 93 and inner hose 94c together.

A second method for manufacturing retractable hose 90c seen in FIG. 3C, comprises extruding inner hose 94c around wire coil 92c. This can be done by extruding a polymer strip onto rotating wire coil 92c as it is being coiled, and bonding the edges of the extruded polymer strip together to form sealed inner hose 94c. After inner hose 94c is formed over coiled wire 92c, outer cover 93 can be woven over inner hose 94c and wire 92c in a separate step. Then wear strip 92a can be extruded onto the hose to form the completed retractable hose 90c. By weaving outer cover 93 over inner hose 94c, the shape of outer cover 93 can be made more strongly convoluted (dips more into the valley between coils of wire 92c). That is, outer cover 93 can have much deeper valleys between adjacent wire coils than shown in FIG. 3C. This is possible because a convoluted hose can have a transverse cross-section that is relatively constant in diameter. This cross-sectional diameter of a convoluted hose can be smaller than the diameter of wire coil 92c, so that the smaller cross-sectional diameter of cover 93 must follow and stay attached to wire 92c in cross-section. Standard hose weaving equipment can be used because of the relatively constant diameter of the outer cover even when convoluted. Additional forming equipment can also be used to shape cover 93 into the desired convoluted shape as cover 93 is woven onto helical wire coil 92c. Wire coil 92c can also help outer cover 93 hold this convoluted shape. Inner hose 94c can also be formed on wire coil 92c with a similar convoluted shape so that outer cover 93 can approximately match the shape of inner hose 94c when in their natural extended shape. In an optional step, collapsible hose 90c can be pressurized and heated to force a molten inner hose 94c into fabric structure of outer cover 93, to form a water-proof and/or air-tight reinforced composite hose.

A third method for manufacturing retractable hose 90c seen in FIG. 3C, comprises weaving outer cover 93 over wire coil 92c (wire 97 and cover 96c). Outer cover 93 can be woven with a number of shapes, including, but not limited to, cylindrical and convoluted. Inner hose 94c can be manufactured separately and then inserted into the combined wire coil 92c and woven cover 93. The shape of woven cover 93 substantially determines the final shape of retractable hose 90c and inner hose 94c. Inner hose 94c can be heated and pressurized to either bond inner hose 94c to wire coil 92c and/or cover 93, or to simply shape inner hose 94c to the interior surface of cover 93 and coil 92c. If woven cover 93 is made strongly convoluted (strong ridge and valley structure) then inner hose 94c will take on that shape when pressurized with liquids or gases flow through it. Notice that this design places inner hose 94c on the inside of coiled wire 92c. Alternatively, the shaping of inner hose 94c can occur after retractable hose 90c has been fitted with connector ends (e.g. connectors 22 and 38), then the complete retractable hose can be pressurize and heated to force inner hose 94c to permanently take on the shape of the interior surface of wire coil 92c and woven cover 93. This heating and shaping process can also be used to bond inner hose 94c to wire coil 97c and/or woven cover 93. Wear strip 92a can be bonded to outer cover 93 after the remainder of hose is retracted to show where wire coil 92c is located. Heat from extruding wear strip 92a or pressing wear strip 92a into cover 93 can also bond cover 93 and inner hose 94c together.

In FIGS. 4A, and 4B, elastic inner hoses 104 and 105, respectively, can be positioned inside outer cover 103 by stretching inner hoses 104 and 105 to the same full length as outer cover 103 and then periodically bonding outer cover 103 to its inner hose. To manufacture these retractable hoses, the inner hoses and outer covers can be manufactured separately and then each of the inner hoses 104 and 105 can be inserted inside its outer cover 103. Bonding patches and/or strips 106 and 107 can be applied to their respective inner hose prior to insertion inside cover 103. The adhesive can remain tack-free while the inner hoses are properly position within their outer cover. The outer covers and inner hoses would be assembled and stretched to properly position inner hoses 104 and 105. Once properly positioned, the adhesive patches, strips and/or rings 106 and 107, that were applied to inner hoses 104 and 105, can be activated to permanently bond the inner hoses to their outer cover 93 at patches, strips and/or rings 106 and 107. The bonding process can be activated by heat or chemicals or other methods. Then the adhesive can be activated by heating it with microwave radiation. A wear strip or one or more wear rings, similar to wear strips 92a-b or wear rings 115 and 125, can be bonded to outer cover 103. The heat and pressure from extruding these wear strips and/or wear rings, can force the hot polymer wear strip through outer cover 103 and bond cover 93 to inner hose 94c.

In FIGS. 4A-B, collapsible hoses 100 and 100a, respectively, can be manufactured with a convoluted hose 104 and a corrugated hose 105 that include protrusions on their outer ridge(s) that can strongly interact against outer cover 103 when assembled. That is, convoluted inner hose 104 and corrugated inner hose 105 can be made with an outside diameter that is significantly larger than the inside diameter of outer cover 103. This can allow inner hoses 104 and 105 to strongly press their ridge(s) against the interior surface of outer cover 103 to hold the inner hose in place with respect to the outer cover. Inner hoses 104 and 105 can be positioned by inserting the inner hose inside cover 103 and extending both to their full length. They can then be allowed to retract together to set the ridges in position on outer cover 103. The connector ends can then be attached and a wear strip applied in separate processes.

In FIG. 4C, the construction of the collapsible hoses 110 can comprise manufacturing outer cover 113 and inner hose 114 together. Wear rings 115 and 115a can then be bonded to outer cover 113 before or after attaching the connector ends (e.g. input connector 82a and output connector 38 (see FIG. 1A)). Alternatively, wear rings 115 and 115a can be extruded onto outer cover 113 immediately after it is woven onto a mandrel. The extruder could move with outer cover 113 as it is being made to provide time for the wear rings to cool. After sufficient cooling the extruder would then return to its starting position and injection mold another set of wear rings onto cover 113 after it is woven. The shape of the wear rings would be determined by the shape of the injection molds. Many wear rings can be injection molded at one time. At the same time, a second extruder can extrude the inner hose 114 and expand it against outer cover 113 to complete the hose. A second alternative could be manufacturing inner hose 114 and outer cover 113 with a previously described method and construct wear rings 115 and 115a to comprise two or more sections that can be snapped around, and/or bonded to, outer cover 113. Such snap together wear rings can be injection molded in separate process and later snapped together and bonded to each other and outer cover 113. Adhesives or ultrasonic welding can be used to bond the wear ring sections together.

In FIG. 4C, when manufacturing outer cover 113, the constriction seen at the surface in contact with wear ring 115a (reduced diameter section), can be woven directly into the shape of cover 113 by changing the length of fibers or yarns reeled out in the radial direction during the weaving, braiding, or knitting process. For example, when weaving a cylindrical tube, the weaving machine can use both radial and longitudinal yarns to form cover 113. In a simple hose weaving operation one or more radial yarn(s) can rotate around cover 113 while weaving in and out of a plurality of longitudinal yarns, and thus forming the woven tube shape. (This is close to the process for a braiding machine, where two sets of yarns rotate in opposite directions as they weave in and out of each other, which process can also be used). To weave the reduced diameter of cover 113, the length of the radial yarn(s) can be shortened in that area by any of a number of control means (e.g. reducing the rate at which the radial yarns are fed into the weaving machine, reducing the mandrel size that the outer cover is being woven on, and/or other control method). This shortening of the radial yarn(s) forces the woven cover 113 to a smaller diameter. In other manufacturing systems, the radial yarns can comprise a single yarn that oscillates back and forth around the outer cover while weaving (alternating) in and out of the longitudinal yarns as it goes. This method can also produce the constricted section by shortening the length of the radial yarn in those sections of cover 113 by many different control means (e.g. reducing the rate at which the radial yarn are fed into the weaving machine, reducing the mandrel size that the outer cover is being woven on, increasing tension on the radial yarn, and/or other control method).

In FIG. 5A, the construction of collapsible hose 120 can comprise manufacturing the hose in a manner similar to that described for hose 110 seen in FIG. 4C, but with outer cover 123 woven with a corrugated shape. Support rings 125 and 125a can then be bonded to outer cover 123 and/or inner hose 124.

In FIGS. 5B through 7B, pressure biased collapsible fire hose systems 150, 160, 170 and 180 can be manufactured in a number of ways. The fluid control systems, like manifold systems 151 and 140 can be injection molded as a single piece or as multiple pieces that can be bonded together. The valves can be installed after manufacturing the manifold system. For use in the fire rescue industry, these control manifolds 151, 140 and 173 would likely be made from a cast and/or machined metal to provide good durability. The fluid control systems can also be machined in plastic. If the fluid control system 151 is injection molded, then it can be injection molded onto the end of hose 40b to form a secure bond. The valves and connectors can then be assembled using approaches commonly used for assembly of prior art valves and connectors. Similarly, hose 40b can be injection molded into hose connector 162 and hose pistons 174 and 184 seen in FIGS. 6 and 7A-B respectively.

In FIG. 1A, collapsible hose fluid control system 51 is shown in its open position (for use) with pressurized fluid flowing from supply connector 52a to hose 40a along flow line 59. With connector 52a attached to a pressurized fluid source 21, fluid can flow through valve 53, to interior channel 52b, and into collapsible hose 40a for use. The pressurized fluid source 21, or supply, can comprise various pumping systems for providing pressurized liquids, pressurized gases, pressurized foams (liquid/gas mixtures), pressurized solid particulate and liquid mixtures, and/or pressurized solid particulate and gas mixtures. With valve 53 open as shown in FIG. 1A, this pressurized fluid can flow into hose 40a and extend it for use. Different nozzle tools can be attached to output connector 38 to provide various functions for the user. For example, a sprinkler head might be attached to connector 38 if the pressurized fluid source 21 is a home water faucet. Similarly, if the pressurized fluid source 21 is an air compressor, then a compressed air nozzle for filling a car tire might be attached to connector 38. Thus, many different tools can be used on the end of connector 38. Further, connector 38 might be replaced with one of the many prior art quick connect ends for fast attachment and removal of nozzles or other tools. When the user is finished, valve 53 can be closed to shut-off pressurized fluid to hose 40a. Then drain valve 54 can be opened so that fluid can escape from hose 40a through suction pump 57. Suction pump 57 can then be turned-on with electrical power from power source 56, and fluid within hose 40a can be suctioned out of hose 40a until it longitudinally retracts to its fully retracted state (see hose 40a in FIG. 2C). This retraction can also include closing off output connector 38 to prevent fluid communication between the interior of hose 40a and the ambient environment, thereby facilitating the creation of a pressure differential between the interior of the hose 40a and the ambient environment. After hose 40a is retracted (longitudinally collapsed) valve 54 can be closed, suction pump 57 turned-off, and (if not done during retraction of the hose) output connector closed off, causing hose 40a to hold its retracted position for stowage. Once in this stowed state, fluid control system 51 and retracted hose 40a can be removed from the pressurized fluid supply 21 and moved to a different fluid supply or placed in storage. As with the other inlet connectors (connector ends) described herein, inlet connector 52a (also see inlet connectors 22, 82a, 152a, 154 and 156) can be replaced with a standard quick connect end for quickly connecting and disconnecting from various pressurized fluid sources. Each particular industry typically has their own standard quick connect end designs (e.g. compressed air quick connects, garden hose quick connects, hydraulic hose quick connects, etc.) any one of which could be used by one of ordinary skill in the art without requiring undue experimentation in place of inlet connector 52a.

In FIG. 1B, extendible and collapsible hose system 60 is shown in its drain position, with valve 63 rotated so that fluid can flow from hose 40a to pump 67 along flow line 69b. From this position rotating valve 63 ninety degrees counter-clockwise would put it in its open position to allow pressurized fluid from connector 52a to flow straight through to hose 40a for use. During use, valve 64 would remain closed (turned approximately ninety degrees from position shown) to prevent water from leaking out through fluid motor 65a. After use, valve 63 would be turned to the drain position shown in FIG. 1B, which also shuts off the pressurized fluid from reaching hose 40a. With valve 63 in its shown position, fluid within hose 40a can be pumped out with suction pump 67. In this position, pressurized fluid can still reach fluid motor 65a by opening valve 64 as shown. With valve 64 turned to its open position, pressurized fluid flowing along flow line 69a can pass through valve 64 and drive fluid motor 65a to produce power. Motor 65a then turns suction pump 67 to create suction pressure that can longitudinally retract collapsible hose 40a. If the output end of hose 40a is closed by an attached nozzle, valve or other flow restricting device, then the hose can be fully retracted by suction pump 67. When hose 40a reaches the desired retracted length, the user can shut off the pressurized fluid being supplied to connector 52a (e.g. valve on system supplying the pressurized fluid) and rotate valve 63 one-hundred eighty degrees to its stowed position. This effectively closes-off the input end of hose 40a and locks the hose in its retracted position by retaining suction pressure within hose 40a. Fluid control system 61 and hose 40a can now be removed from its pressurized fluid source 21 at supply connector 52a and remain fully retracted for transport.

In FIG. 1C, collapsible hose fluid control system 71 is functionally the same as fluid control system 61, except for the type of suction pump used. Fluid control system 71 use a reverse venturi pump comprising nozzle 75 and throat/pump 77, instead of motor 65a and suction pump 67 used in fluid control system 61. Valves 73 and 74 can operate the same as valves 63 and 64 in fluid control system 61. The reverse venturi pump works by using nozzle 75 to accelerate the pressurized fluid and spraying it at high-speed through throat 77 along flow path line 79a. As the high-speed fluid travels at toward throat 77, it creates a low pressure across its surface and causes fluid around nozzle 75 to become entrained in that high-speed stream of fluid. This entrained fluid, along with fluid from nozzle 75, is then pushed out through throat 77 at high-speed and out through discharge port 78. This creates a low pressure area behind venturi throat 77 that is used to suction fluid out of hose 40a along flow path lines 79b. Once hose 40a is retracted, the pressurized fluid can be shut-off at the pressurized fluid supply source 21 (supply valve not shown) and valve 73 rotated one-hundred eighty degrees to close-off the entrance to hose 40a and lock hose 40a in its retracted position. When valves 63 or 73 are rotated to their closed or stowed position which one-hundred eighty degrees from their drain position (shown), there is a short time lag in between where air can be sucked back into hose 40a from the environment through pump system 67 and 77. The amount of air sucked into the retracted hose 40a will depend on how fast valves 63 and 73 are turned one-hundred eighty degree to their closed and stowed position, and/or how much elastic force exists in the collapsed hose that is trying to re-extend the hose. If collapsible hose 40a is designed with a low tendency to re-extend, and/or if the pumping systems does not allow significant reverse flow through them, then very little air may be sucked into hose 40*a* before valves 63 and 73 can be closed.

In FIGS. 2A-C, we see the three main positions for valve 83 on fluid control systems 81, open position (FIG. 2A), drain position (FIG. 2B), and closed position (FIG. 2C). Collapsible hose 40*a* is attached to right end of system 81 to receive pressurized fluid from connector 82*a* when valve 83 is in its opened position (FIG. 2A). A pressurized fluid supply 21 would be connected to supply connector 82*a* to provide pressurized fluid to channel 82*b*. Valve 83 directs this pressurized fluid along different paths depending on the rotated position of valve 83. In FIG. 2A, valve 83 is shown in its open position for supplying pressurized fluid from supply connector 82*a* to hose 40*a*. In this position, hose 40*a* can be used like a normal hose. Venturi nozzle channel 85 and venturi suction pump chamber 86 are closed off from the pressurized fluid by valve 83 when in this position. After the user is finished using hose 40*a*, valve 83 can be turned to its drain position (see FIG. 2B) to retract the hose.

In FIG. 2B, valve 83 is shown in its drain position which in this example is about seventy degrees clockwise from it open position seen in FIG. 2A. This position of valve 83 allows pressurized fluid to flow through valve channel 83*b* and into venturi nozzle channel 85. In this same position, valve 83 also allows fluid within hose 40*a* to be suctioned out through valve channel 83*c*. The shape and size of channels 83*b* and 83*c* are chosen so that channel 83*b* can supply pressurized fluid to venturi nozzle 85*a* along fluid flow path 89*b*, and channel 83*c* can provide a flow path 89*c* for fluid to be suctioned out of hose 40*a*. This is accomplished by venturi nozzle 85*a* spraying a high-speed stream of pressurized fluid out of nozzle 85*a* and into venturi throat 87 a short distance away. The fast moving flow of fluid from nozzle 85*a* captures some of the fluid in suction chamber 86 and sweeps (entrains) it along through throat 87 to force it out discharge port 88 along flow path 89*c*. This process creates a low pressure area in suction chamber 86 that can suction fluid out of hose 40*a* through channel 83*c* and cause the hose to retract. Having an all-in-one valve, like valve 83, can require precise positioning of the valve to supply pressurized fluid to nozzle 85*a* and provide a flow path between hose 40*a* and suction chamber 86. Thus, valve 83 can be designed to snap into the correct rotary position shown in FIG. 2B when turned by the user to that position. In this way both valve channels 83*b* and 83*c* can easy be correctly positioned. After the user has had valve 83 in the drain position for a while, hose 40*a* can be retracted to its fully retracted position (see FIG. 2C). At this point the user can turn valve 83 clockwise to its closed position for storage.

In FIG. 2C, valve 83 is shown in its closed position which is about thirty degrees clockwise from it drain position seen in FIG. 2B. The small angular distance between the drain position and the closed position for valve 83 ensures that the valve can be transitioned from the drain position to the closed position very quickly. This makes it possible for very little fluid to back up into hose 40*a* during the transition and hose 40*a* can stay retracted for stowage. In FIG. 2C, valve 83 can be at the end of its rotation in the clockwise direction, so that valve 83 stops at the shown closed position and gaskets 84*a* and 84*c* properly close-off the pressurized fluid supply source 21 connected to connector 82*a* and properly close-off the input end of hose 40*a*, respectively. Similarly, in FIG. 2A, valve 83 can be at the end of its rotation in the counter-clockwise direction so that valve 83 stops with main supply channel 83*a* aligned to supply pressurized fluid to hose 40*a*.

During operation, collapsible hoses 90*a-c* shown in FIGS. 3A-C are extended by the above ambient internal pressure from the pressurized fluid source 21, and each collapsible hose can fully retract when internal pressure below ambient pressure is supplied by suction source 27. For hoses 90*a* and 90*b*, their extended shape is determined substantially by the shape of cover 93, which can be nearly a perfect cylinder. For hose 90*c*, its final shape is strongly influenced by the shape of outer cover 93, but is also affected by internal wire coil 92*c*. Inner hoses 94*a-c* can provide a water-proof and air-tight conduit for hoses 90*a-c*, respectively. After use, vacuum pressure is provided to the interior channel of inner hoses 94*a-c* to pump fluid out of hoses and cause the hoses to retract. Wear strip 92*a*, and wire wear strip 92*b*, and internal wire coil 92*c* each provide radial support for their respective hose so that vacuum pressure does not collapse their inner hose before they fully retract longitudinally.

In FIG. 4A-B, collapsible hoses 100 and 100*a* collapsible hose 100 will be focused on here, but the reader should understand hose 100*a* operates substantially the same way. In FIG. 4A, when pressurized fluid is communicated to inlet connector 22, inner hose 104 begins to extend longitudinally and expand radially. Because of bonding pads and/or strips 106, inner hose 104 is substantially fixed in relationship to outer cover 103. Thus, as inner hose 104 continues to expand longitudinally and radially, outer cover 103 extends with it to its full length. Even before reaching full length, inner hose 104 can be pressed against the inside wall of outer cover 103. Once extended, hose 100 can be used for transferring fluids. Once finished, the user can turn off the pressurized fluid going into connector 22 and allow the fluid in the hose to drain out of inner hose 104. The elastic nature of inner hose 104 causes hose 100 retract to approximately the position shown in FIG. 4A. This position is only a partially retracted state and suction pressure can be applied to connector 22 to remove additional fluid from hose 100 and fully retract the hose. Because hose 100 and 100*a* can retract considerably without suction pressure, much of the retracting of the hose can be done without suction pressure. Thus, when hoses 100 and 100*a* are in the relaxed state shown in FIGS. 4A-B, respectively, only a small vacuum suction pressure is needed to further collapse the convolutions and corrugations in inner hoses 104 and 105, respectively. Further, once partially retracted, the ridged nature of hoses 100 and 100*a* provide radial support that can prevent radial collapse of the inner hose when below ambient pressure is applied. This ridged structure allows hoses 100 and 100*a* to collapse in the longitudinal direction, while at the same time providing strength in the radial direction (with the convoluted and corrugated ridges) to prevent radial collapse of the hose. Thus, while some elastic biasing is present, this elastic biasing may not be determinative of the extended and/or retracted lengths of hoses 100 and 100*a*.

Collapsible hoses 110 and 120 in FIGS. 4C and 5A can operate in substantially the same manner as hoses 90*a-c*. For example, wear resistant rings 115, 115*a* and 125 in FIGS. 4C and 5A can provide substantially the same protection as helical wear protection strips 92*a*, despite the differences in form between the wear resistant rings and the helical wear protection strips. In operation, when outer cover 113 of hose 110 is extended as shown in FIG. 4C, wear rings 115, and 115*a* can contact the ground or other flat surface before outer cover 113. Thus, during use, cover 113 is protected from damage by wear rings 115, and 115*a* which take the majority of contact with abrasive and wearing surfaces. When not in use, wear rings 115, and 115*a* can be collapsed next to each other to protect outer cover 113 from damage during storage and from the environment. In operation, hose 120 has a corrugated outer cover 123 which can help outer cover 123 fold up and allow wear rings 125 to retract next to each to form a complete protective cover comprising wear rings 125. This provides very good protection of hose 120 while stowed.

In FIG. 5B, fluid control system 151 is connected to collapsible fire hose 40b to provide three different fluid supplies to hose 40b. Before operation, fire hose 40b can be retracted (see hose 40a in FIG. 2C). To begin operation, valve 155 can be opened to allow compressed air from connector 154 to extend hose 40b to the desired length without substantially increasing its mass. Valve 155 can then be closed and valve 153 opened to provide pressurized fluid to hose 40b for use of the fire hose. When finished using fire hose 40b, the user can close valve 153 to stop fluid flow and then open compressed air valve 155 before suction valve 157. If valve 155 is opened first, the compressed air will tend to expel most of the pressurized fluid through the nozzle end (output end) of hose 40b (presuming, of course, that the nozzle end is opened to allow fluid communication between the ambient environment and the interior of the hose). After valve 155 is closed valve 157 can be opened to supply suction pressure to hose 40b. With the nozzle end of hose 40b closed, this suction pressure from suction supply 27 (connector 156) will retract, and remove the contents of, hose 40b. Once fully retracted, all valves can be closed so that hose 40b will remain in it retracted position for stowage. In alternate systems, valves 153, 155, and 157 may be omitted, such as where pressurized fluid, compressed air, and suction pressure is supplied to fluid control system 151 though connector ports 152a, 154 and 156 by external equipment that can control these supplies at their source.

In FIGS. 6, 7A and 7B, the operation of these collapsible fire hose systems is substantially the same. Four basic functions are provided by the pumping systems: 1) they can provide compressed air to extend the collapsible hose to its extended or near extended length, which provides the user with a light weight air filled hose to position for use, 2) they can provide pressurized fire suppressant fluid (e.g. water) to the collapsible hose for putting out fires and/or extending the hose, 3) they can provide additional compressed air to blow fire suppressant fluid out of the hose when finished, 4) they can provide a suction or vacuum pressure to forcefully retract the hose to its collapsed length and also hold the hose in this collapsed length, and 5) the pumping systems can refill the collapsible hose with a liquid once locked and stowed in its retracted position to avoid gas and liquid bursts during startup that avoids using compressed air in step 1) above. The vacuum pressure can also vaporize water remaining within the collapsible hose, essentially freeze drying the interior of the hose so that it does not mildew.

In FIG. 6, a complete collapsible fire hose system is shown comprising a collapsible hose assembly 160, a rotary pump 130 and a valve manifold system 140. Manifold system 140 is used to operationally connect hose assembly 160 to rotary pump 130. During operation, this system can extend collapsible hose 40b for use with compressed air from pump 130 or pressurized fluid flow 149b from onboard pumps or a municipal water supply. When extending hose 40b, the working end of hose 40b (see nozzle 189 in FIG. 7B) would be closed off to allow pressure to build up within the hose to extend it. Valves 142 through 147 are shown in the positions necessary to pump air along path 148a, through pump 130 and then along path 148b to extend hose 40b as shown. Once extended, valve 142 could be closed and valve 144 opened to allow pressurized fluid 149b to finish extending hose 40b, and supply the fire suppressant fluid (water, carbon dioxide gas, foam fire retardant, etc.). In an actual emergency operation compressed air (or other gas, i.e. carbon dioxide) might be used to start hose 40b extending as shown in FIG. 6, but, before the hose could fully extend, valves 142 and 144 could be, respectively, opened and closed, thereby allowing the fire suppressant to get to the end of fire hose 40b more quickly, while still keeping the hose light weight for most of the extending process. Fluid 149b flows through valve 144, main manifold 141c, pipe 161 and eventually into collapsible hose 40b, pushing any gas that is in these channels ahead of it. Spray nozzle 189 (see FIG. 7B) would need to be open to allow compressed air to escape. In alternate operations hose 40b might be stored with water or a water mixture in it to eliminate any air pockets. Then fluid supply 149b can be used to extend hose 40b directly. Because fluid 149b can be delivered at very high pressure and high flow rates, hose 40b can be extended very quickly even with a liquid and be shot out of storage tube 165 toward the area of its intended use. If this is done a protective cover over nozzle 189 might be used to prevent damage to the nozzle during landing. Note that for a ballistic extension, the straight storage tube end 178 seen in FIG. 7A would probably be used instead of curved down storage tube end 188 seen in FIG. 7B to allow the quick exit of hose 40b from its storage tube. Storage tube 165 can be angled upward so that the quickly exiting hose can have travel further and be more fully extended before reaching the ground. Compressed air can also be used to "shoot" the hose out of its storage tube, but the small size of pump 130 might require a compressed air storage tank at valve 143 to supply a large amount of compressed air quickly when valve 142 is opened (valve 143 opened to supply stored compressed air).

After the fire hose system is finished being used, valves 146 and 143 can be opened and valves 142, 144 and 147 closed. Then when pump 130 is turned on, fluid within manifold 141b and hose 40b can be sucked out through pump 130 and expelled from the system through valve 143. Once hose 40b is fully retracted, valves 143 and 146 can be closed to maintain the vacuum within the system for stowage and keep hose 40b in its retracted position. Alternately, before applying suction to the system with pump 130, valves 142 and 147 can be opened (as shown in FIG. 6) so that pump 130 can force compressed air through the system and expel fire suppressant fluid inside the system out the end of hose 40b (spray nozzle's end open). After the fluid has been expelled, valves 142 and 147 can be closed and valves 143 and 146 can be opened to provide suction to retract the now nearly empty hose (spray nozzle end closed). This method of first evacuating the hose of dense liquids is most important as larger diameter hoses are used because of their weight when full of dense liquid. This makes it much easier for the vacuum pressure flow 149c to pull hose 40b back into its storage tube 165. This same technique of evacuating hose 40b with compressed air and then using suction or vacuum pressure to drag hose 40b back into its storage tube can be used with collapsible hose systems 170 and 180 seen in FIGS. 7A and 7B, respectively.

Fire hose system 170 of FIG. 7A can operate substantially the same as the fire hose systems seen in FIGS. 5B and 6, with the exception that, in FIG. 7A, hose 40b is depicted as mounted on a movable piston 174 which allows the rearward end of hose 40b to extend nearly to the opened end of storage tube 176. This increases the effective length of hose 40b by the length of tube 176. If hose 40b has a three to one expansion ratio, having piston 174 and the rear end of hose 40b moves to the open end of tube 176 would provide the hose with an effective length of four times its original collapsed length from hose connector 172. If hose 40b has a five to one expansion ratio, the effective expansion ratio would be six times its original length. During operation, compressed air flow 149a or pressurized fire suppressant fluid 149b can be used to provide pressure to rear surface 174a of piston 174 and to the interior of hose 40b through passageway 174d. This pressure creates a force 174e tending to push piston 174 along cylinder wall 176a to the right in FIG. 7A while at the same time tending to longitudinally expand hose 40b. As fluid continues to flow into storage tube 176, piston 174 continues moving to the right until it is stopped at hose stop 176b which can comprise a raised ridge on cylinder wall 176a for front surface 174b of piston 174 to catch on. Sealing ring 174c seals against cylinder wall 176a and prevents fluid from leaking into the area between hose 40b and storage tube 176. After use, pumping and vacuum system 179 can be used to provide suction pressure 149c to the interior of system 170 and the pressure forces 174e can then drop below ambient pressure so that atmospheric pressure tends to push piston 174 back into tube 176 until it contacts connector end 172. Hose 40b also tends to retract because of this vacuum pressure, and if not prevented by obstructions or the weight of the hose itself (and fluids within), fire hose 40b can self-retract back into storage tube 176.

In FIG. 7A, collapsible hose system 170 is shown nearly in its fully extended and operating position. Piston 174 is not in its fully extended position against stop 176b to allow the reader to see both front surface 174b of piston 174 and piston stop 176b on storage tube 176. When fully retracted, hose 40b would be in its stowed position within storage tube 176 (see hose 40b retracted in tube 185 in FIG. 7B), and rear surface 174a of piston 174 is forced against connector 172. From this retracted position with valves 173a-b closed, valve 173a can be opened so that pumping system 179 can provide compressed air flow 149a to manifold 173 and extend piston 174 and hose 40b. Because compressed air is used, hose 40b is very light and easy to manage. After extended, or while hose 40b is extending, valve 173a can be closed and valve 173b can be opened to allow pressurized fire suppressant fluid 149b to flow through hose 40b and be used to fight fires. When fully extended piston 174 is positioned against hose stop 176b and hose 40b is fully extended. After use, the spray nozzle at the right end of hose 40b is closed, then valve 173b can be closed and valve 173a can be opened so that compressed air can be forced through pipe 171 and hose 40b to force any liquids out of the system including hose 40b. This lightens the weight of hose 40b and pumping system 179 can then be switched to provide a suction vacuum which tends to pull piston 174 back against connector 172 and pull hose 40b back to its longitudinally collapsed state (fully retracted inside storage tube 176). Valves 173a-b can then be kept closed to maintain this retracting suction force on the collapsible hose system. Additional locking systems might be used at the open end 178 of storage tube 176 to maintain hose 40b in its retracted position even if vacuum pressure is lost within pipe 171 and hose 40b.

In FIG. 7B, we see a complete fire fighting system with a collapsible fire hose system 180 mounted on fire truck 190. Collapsible fire hose 40b is shown completely stowed (collapsed) within storage tube 185. During use, fire truck 190 can drive to a fire and carry a supply of fire suppressant fluid (water) in a large onboard tank. Once at the fire, pumping system 179 can provide compressed air or pressurized fluid to pipe 171 and hose 40b. This pushes piston 184 forward and hose 40b out of the right end of curved end 188. A fire fighter would then grab nozzle 189 as it extends and run the hose toward the fire. The light weight of the compressed air in the hose would make it easy to drag hose 40b along the ground. As the firefighter nears the fire, the fire suppressant can be pumped into pipe 171 through valve 173b and begin to fill hose 40b. The firefighter then can open spray nozzle 189 which releases the compressed air used to extend hose 40b. As the compressed air is released from nozzle 189, the fire suppressant fluid fills hose 40b until it reaches nozzle 189 and exits the nozzle. Then the fluid can be used to suppress the fire. To retract hose 40b and piston 184, compressed air can first be used to blow most of the water or fire suppressant liquids out of hose 40b to reduce its weight. Then pumping system 179 can then be switched to vacuum pressure and spray nozzle 189 can be closed to suck piston 184 back down storage tube 185 along with retractable hose 40b back to the shown retracted position seen in FIG. 7B. The system is now ready to go to another fire and be used.

In alternate designs, it might not be desirable to have air inside the hose while extending the hose because liquid fire suppressants would tend to cough and jerk the spray nozzle around until all the compressed air is expelled. Thus, hose 40b might be kept filled with water and then also be extended with a fire suppressant liquid so that the danger of sudden gas bursts is eliminated. This however requires much more effort by the firefighters to extend the heavy liquid filled hose. So in this case, a straight storage tube like tube 176 seen in system 170 might be used so that hose 40b can be ballistically extended toward the fire, and thus reducing the need for the firefighters to drag the hose long distances. Compressed air could still be used to force water out of the hose when finished to allow easy retraction of the hose. To refill hose 40b with a liquid, spray nozzle 189 could be locked in place at storage tube end 188 and hose 40b refilled with water to eliminate air from the system. Then the system is ready to be used at a different fire.

The disclosed collapsible hoses and collapsible hose systems can be used to obtain various advantages over previous retractable and extendible hoses. First, the technology described herein can be used to construct collapsible hoses which do not require mechanical biasing structures such as an elastic hose or a coiled spring, which can simplify construction and reduce manufacturing costs. Second, the disclosed technology can be used to implement systems which provide large retracting forces on demand and allow very compact retracted length for their hose portions (e.g., less than $1/10^{th}$ extended length). Third, the technology described herein can be used to implement a retractable hose which will not inadvertently begin to retract when fluid within the hose is at relatively low (but still greater than ambient) pressure due to excessive biasing provided by a mechanical biasing structure. Fourth, the disclosed technology can be used to implement systems in which compressed air or other gas can be used to extend large diameter hoses thereby keeping the mass of their hose portions low during extension.

Although the above description contains many concrete examples of how the disclosed technology could be implemented and/or used in practice, these examples should not be treated as implying limitations on the potential manners in which the disclosed technology could be implemented and/or used in practice. For example, fabric outer covers 93, 103, 113 and 123, can be replaced by other reinforced covers that can handle the forces caused by internal pressure and use of the retractable hoses. Similarly, additional or alternative combinations of outer cover, inner hose, and bonding methods are possible, and the relative sizes of inner hose and outer covers (in implementations where such separate inner and outer covers are present) can be adjusted as needed for specific hoses. Also, the corrugated and convoluted inner hoses can comprise other cross-sectional shapes beside the sinusoidal shaped cross-sections shown. Cylindrically shaped hose bodies can be corrugated or convoluted between radial support members (wire coil, polymer wear strip, polymer rings, etc.), and corrugated inner hoses can also have more than one corrugation diameter. For example, a corrugated inner hose might have a larger diameter corrugated ridge every third ridge with one or more smaller diameter corrugated ridges between each pair of larger diameter corrugated ridges, which would allow the larger diameter ridges to press firmly against the inside of the outer cover to prevent slipping of the inner hose with respect to the outer cover, while the smaller diameter ridges could allow space for the outer cover to fold and collapse longitudinally. Many alternative bonding methods also exist and many different adhesives can be used depending on the materials types being bonded. In that same spirit, multiple fluid sources described herein (e.g., a compressed gas, a pressurized fire suppressant, and a vacuum pressure) can be applied in different orders and combinations to provide the desired extension and retraction characteristics.

Accordingly, instead of limiting the protection accorded by this document, or by any document which is related to this document, to the material explicitly disclosed herein, the protection should be understood as being defined by claims when the terms used in those claims which are set forth below under the label "Explicit Definitions" are given the explicit definitions set forth under that label, and the remaining terms are given their broadest reasonable interpretation as shown by a general purpose dictionary. To the extent that the interpretation which would be given based on the above disclosure or incorporated priority document is in any way narrower than the interpretation which would be given based on the "Explicit Definitions" and the broadest reasonable interpretation as shown by a general purpose dictionary, the interpretation provided by the "Explicit Definitions" and the broadest reasonable interpretation shall control, and the narrower interpretation shall have no effect.

Explicit Definitions

When used in the claims, "extended length" of a channel should be understood as meaning length of the channel when pressure on fluid in the interior of that channel is substantially greater than ambient pressure.

When used in the claims, "flexible conveying channel" should be understood to refer to the interior portion of a hose through which fluid would be conveyed during the hose's operation. Each retractable and extendible hose example within this document has a flexible conveying channel. Examples of flexible conveying channels in this document comprise the interior portion of hose 40a from FIG. 1A through which fluid path 59 extends, and the interior of inner hoses 104 and 105 from FIGS. 4A and 4B, respectively.

When used in the claims, "fluid" should be understood to mean any material or combination of materials that can be transported by pressure through a hose or conduit. Examples of "fluids" include liquids (e.g. water), gases (e.g. carbon dioxide), liquid/gas mixtures (e.g. foams), solid particulate/gas mixtures (e.g. fire retardants blown by compressed air), and solid particulate/liquid mixtures (e.g. a fire retardants suspended in water).

When used in the claims, "means for controlling input fluid pressure" should be understood as an element expressed as a means for performing a specified function as provided for in the sixth paragraph of 35 U.S.C. § 112, where the specified function is "controlling input fluid pressure" and the corresponding structure described in the specification is a fluid control system (examples of which are illustrated in the figures as 51, 61, 71, 81, 140, 151, and the combination of manifold 173 and valves 173a-b).

When used in the claims, "natural length" of a channel should be understood as meaning length of the channel when pressure on fluid in the interior of that channel is not substantially different from ambient pressure.

When used in the claims, "pressure substantially greater than ambient pressure" should be understood as meaning pressure sufficient to extend a channel containing fluid at that pressure from natural length.

When used in the claims, "pressure substantially less than ambient pressure" should be understood as meaning pressure sufficiently lower than ambient pressure that a channel containing fluid at that pressure will retract from natural length.

When used in the claims, "retracted length" of a channel should be understood as meaning length of the channel when pressure on fluid in the interior of that channel is substantially less than ambient pressure.

When used in the claims, "vacuum pressure" should be understood as being synonymous with "suction pressure", and should be understood as referring to a pressure below ambient pressure (i.e., a negative relative pressure compared to ambient pressure).

What is claimed is:

1. A device comprising:
    a) a flexible conveying channel having an extended length and a retracted length, the extended length being at least twice the retracted length, the flexible conveying channel having a radial support structure comprising a convoluted hose body providing a resistance to radial collapse greater than the flexible conveying channel's resistance to longitudinal collapse;
    b) a fluid control system that interposes and places an input end of the flexible conveying channel in fluid communication with:
        i) a source of pressurized gas at a first pressure greater than ambient pressure;
        ii) a source of pressurized liquid at a second pressure greater than ambient pressure; and
        iii) a source of suction pressure at a pressure less than ambient pressure, wherein the pressurized liquid is discharged from the flexible conveying channel and into an ambient environment at an output end of the flexible conveying channel;
    c) a storage tube that receives the flexible conveying channel when at the retracted length; and
    d) a piston movably positioned within the storage tube and sealingly engaging an inner wall of the storage tube, wherein the piston is attached to the input end of the flexible conveying channel and defines a center passageway through which fluids may traverse to enter or exit the flexible conveying channel.

2. The device of claim 1, wherein the fluid control system comprises an exit channel and an input channel fluidly coupled to the input end of the flexible conveying channel and including one or more valves selectively actuatable to provide the pressurized gas or the pressurized liquid to the flexible conveying channel or expose the flexible conveying channel to the suction pressure.

3. The device of claim 2, wherein the one or more valves comprises:
a first valve adapted to control fluid communication between the flexible conveying channel and the source of pressurized liquid;
a second valve adapted to control fluid communication between the flexible conveying channel and the source of pressurized gas; and
a third valve adapted to control fluid communication between the flexible conveying channel and the exit channel.

4. The device of claim 2, wherein the one or more valves consists of a valve adapted to selectively prevent fluid communication through the input end of the flexible conveying channel or to permit fluid communication between the flexible conveying channel and the input channel and the exit channel.

5. The device of claim 1, further comprising a flow restrictor attached to the output end and adapted to selectively restrict fluid communication through the output end of the flexible conveying channel.

6. The device of claim 1, wherein the radial support structure is adapted to resist radial collapse when fluid in the flexible conveying channel is under the pressure less than ambient pressure.

7. The device of claim 1, further comprising a mechanical biasing structure adapted to partially retract the flexible conveying channel.

8. The device of claim 1, wherein the flexible conveying channel has a natural length which is greater than the retracted length and less than the extended length.

9. The device of claim 1, wherein the source of pressurized gas and the source of suction pressure each comprise a pump in fluid communication with the flexible conveying channel.

10. A method comprising:
a) extending a flexible conveying channel to an extended length by introducing pressurized gas at a first pressure greater than ambient pressure into the flexible conveying channel, the flexible conveying channel having:
   i) a radial support structure comprising a convoluted hose body capable of resisting radial collapse greater than the flexible conveying channel's resistance to longitudinal collapse; and
   ii) a natural length, the extended length and a retracted length, the natural length being greater than the retracted length and less than the extended length, the extended length being at least twice the retracted length;
b) conveying pressurized liquid at a second pressure greater than ambient pressure through the flexible conveying channel, and discharging the pressurized liquid from an output end of the flexible conveying channel and into an ambient environment; and
c) retracting the flexible conveying channel to the retracted length by establishing fluid communication between the flexible conveying channel and a source of suction pressure at a pressure less than ambient pressure,
wherein extending the flexible conveying channel to the extended length includes:
   i) introducing the pressurized gas into a storage tube that receives the flexible conveying channel, wherein a piston is movably positioned within the storage tube and sealingly engages an inner wall of the storage tube;
   ii) flowing the pressurized gas through a center passageway defined in the piston; and
   iii) moving the piston within the storage tube with the pressurized gas and thereby extending the flexible conveying channel to the extended length and at least partially out of the storage tube.

11. The method of claim 10, wherein retracting the flexible conveying channel to the retracted length is preceded by removing the pressurized liquid from the flexible conveying channel by introducing gas at a third pressure greater than ambient pressure into the flexible conveying channel.

12. The method of claim 11, further comprising:
a) locking the flexible conveying channel at the retracted length; and
b) removing the pressurized liquid from the flexible conveying channel while the flexible conveying channel is locked at the retracted length.

13. The method of claim 11, further comprising discharging the liquid from the output end of the flexible conveying channel with the gas introduced at the third pressure.

14. The method of claim 10, wherein retracting the flexible conveying channel to the retracted length further comprises closing off the output end of the flexible conveying channel.

15. The method of claim 10, wherein the pressurized liquid is a fire suppressant and the method further comprises fighting a fire by directing the fire suppressant through the flexible conveying channel into the ambient environment.

16. The method of claim 10, wherein the piston is attached to an input end of the flexible conveying channel and retracting the flexible conveying channel to the retracted length comprises applying the suction pressure to the storage tube and thereby moving the piston within the storage tube to retract the flexible conveying channel toward the retracted length and at least partially into the storage tube.

17. A method comprising:
a) extending a flexible conveying channel to an extended length by introducing pressurized gas at a first pressure greater than ambient pressure into the flexible conveying channel, the flexible conveying channel having:
   i) a radial support structure comprising a convoluted hose body capable of resisting radial collapse greater than the flexible conveying channel's resistance to longitudinal collapse; and
   ii) a natural length, the extended length and a retracted length, the natural length being greater than the retracted length and less than the extended length, the extended length being at least twice the retracted length;
b) conveying a pressurized liquid at a second pressure greater than ambient pressure through the flexible conveying channel, and discharging the pressurized liquid from an output end of the flexible conveying channel and into an ambient environment; and
c) removing the pressurized liquid from the flexible conveying channel by introducing gas at a third pressure greater than ambient pressure into the flexible conveying channel,
wherein extending the flexible conveying channel to the extended length includes:
   i) introducing the pressurized gas into a storage tube that receives the flexible conveying channel, wherein a piston is movably positioned within the storage tube and sealingly engages an inner wall of the storage tube;

ii) flowing the pressurized gas through a center passageway defined in the piston; and iii) moving the piston within the storage tube with the pressurized gas and thereby extending the flexible conveying channel to the extended length and at least partially out of the storage tube.

18. The method of claim 17, further comprising, after removing the pressurized liquid from the flexible conveying channel, retracting the flexible conveying channel into a rigid storage tube using a retracting device selected from:

a) rollers; and b) belts.

19. The method of claim 17, further comprising retracting the flexible conveying channel to the retracted length by establishing fluid communication between the flexible conveying channel and a source of suction pressure at a pressure less than ambient pressure.

* * * * *